United States Patent
Ohmura et al.

(10) Patent No.: US 11,001,257 B2
(45) Date of Patent: May 11, 2021

(54) VEHICLE CONTROL DEVICE AND VEHICLE CONTROL METHOD

(71) Applicant: MAZDA MOTOR CORPORATION, Hiroshima (JP)

(72) Inventors: Hiroshi Ohmura, Hiroshima (JP); Rie Awane, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 205 days.

(21) Appl. No.: 16/442,707

(22) Filed: Jun. 17, 2019

(65) Prior Publication Data
US 2020/0039511 A1    Feb. 6, 2020

(30) Foreign Application Priority Data

Aug. 6, 2018    (JP) .............................. JP2018-147845

(51) Int. Cl.
*B60W 30/12*    (2020.01)
*B60W 10/20*    (2006.01)
*B60W 40/072*    (2012.01)
*B60W 40/105*    (2012.01)
*B62D 6/02*    (2006.01)
(Continued)

(52) U.S. Cl.
CPC ............. *B60W 30/12* (2013.01); *B60W 10/20* (2013.01); *B60W 30/18145* (2013.01); *B60W 40/06* (2013.01); *B60W 40/072* (2013.01); *B60W 40/105* (2013.01); *B62D 6/02* (2013.01); *B62D 6/08* (2013.01); *B62D 15/025* (2013.01);
(Continued)

(58) Field of Classification Search
CPC ........... B60W 30/12; B60W 30/18145; B60W 40/06; B60W 10/20; B60W 40/072; B60W 40/105; B60W 2710/20; B62D 15/025; B62D 6/02; B62D 6/08; B60Y 2400/303; B60Y 2400/307
See application file for complete search history.

(56) References Cited

U.S. PATENT DOCUMENTS 8,457,868 B2 *   6/2013   Tange ................. B60T 8/17557
                                                             701/116
10,065,639 B2 *   9/2018   Taniguchi ............. B60W 30/12
(Continued)

FOREIGN PATENT DOCUMENTS

JP    2017-174017 A    9/2017

*Primary Examiner* — Jason Holloway
(74) *Attorney, Agent, or Firm* — Studebaker & Brackett PC

(57) ABSTRACT

A control unit functionally comprises a first steering-torque application control part which commands a steering actuator of a vehicle to execute application of a steering torque determined by a first steering characteristic CH1 and a second steering-torque application control part which commands the steering actuator of the vehicle to execute application of a steering torque determined by a second steering characteristic CH2. In a case where the vehicle travels at a curved portion of the lane, the first steering characteristic CH1 is set such that a first steering-force increase part L1 is located further toward an allowed right-end point $E_{GR}$ as a vehicle speed becomes higher and the second steering characteristic CH2 is set such that a magnitude of a torque maintenance part L4 becomes lower as a radius of curvature of the curved portion of the lane becomes smaller, like CH2H-CH2L.

13 Claims, 14 Drawing Sheets

(51) Int. Cl.
*B62D 6/08* (2006.01)
*B60W 30/18* (2012.01)
*B60W 40/06* (2012.01)
*B62D 15/02* (2006.01)

(52) U.S. Cl.
CPC .... *B60W 2710/20* (2013.01); *B60Y 2400/303* (2013.01); *B60Y 2400/307* (2013.01)

(56) References Cited

U.S. PATENT DOCUMENTS

| | | | |
|---|---|---|---|
| 10,099,689 B2* | 10/2018 | Wada | B60W 50/0097 |
| 2011/0015850 A1* | 1/2011 | Tange | B62D 15/025 |
| | | | 701/116 |
| 2015/0344068 A1* | 12/2015 | Taniguchi | B62D 6/003 |
| | | | 701/41 |
| 2018/0086341 A1* | 3/2018 | Taniguchi | B62D 6/002 |
| 2019/0092325 A1* | 3/2019 | Oka | B62D 15/025 |

* cited by examiner

VEHICLE CONTROL DEVICE AND VEHICLE CONTROL METHOD

BACKGROUND OF THE INVENTION

The present invention relates to a vehicle control device and a vehicle control method, and in particular to a steering assist technology of a vehicle.

A steering assist technology for lane departure prevention is applied to a vehicle, such as an automotive vehicle, as a kind of technology of previously preventing occurrence of an accident. For example, Japanese Patent Laid-Open Publication No. 2017-174017 discloses a technology in which a steering force is applied to a steering wheel of a vehicle so as to prevent the vehicle from deviating from a lane.

In the technology disclosed in the above-described patent document, partition lines of the lane and a road end are detected by an onboard camera, and an application start point of the steering force is set on an inside of the partition line located on the side of the road end according to a width between this partition line and the road end.

According to the technology disclosed in the above-described patent document, the steering force for returning the vehicle to an inside of the lane is applied to the steering wheel in a case where the vehicle approaches the partition line located on the side of the road end, so that the vehicle can be prevented from deviating from the partition line toward the road end.

In this technology, however, there is a concern that troublesome or uncomfortable feelings may be given to a driver in case where the vehicle travels at a curved portion of the lane. That is, since the technology disclosed in the above-described patent document is configured such that the application start point of the steering force is set on the inside of the partition line located on the side of the road end according to the width between this partition line and the road end, the steering force is applied according to a position of the vehicle relative to the partition line regardless of a radius of curvature of the curved portion of the lane, a vehicle speed, or the like.

If the steering force which the driver does not expect is applied in the case where the vehicle travels at the curved portion of the lane, there may occur a situation where the steering force for guiding the vehicle to a path (route) which is different from a traveling path (route) of the vehicle expected by the driver is applied. Therefore, troublesome or uncomfortable feelings may be given to the driver improperly. In a case where this improper situation continues, the driver comes to be subjected to excessive stress during vehicle driving.

SUMMARY OF THE INVENTION

The present invention has been devised in view of the above-described matter, and an object of the present invention is to provide a vehicle control device and a vehicle control method which can properly prevent troublesome/uncomfortable feelings or stress from being given to the driver during the vehicle driving, securing the high safety by preventing the vehicle's lane departure.

One aspect of the present invention is a vehicle control device for applying a steering force to a steering wheel of a vehicle according to a vehicle traveling condition, comprising a steering-force generator to generate the steering force applied to the steering wheel, a lane detector to detect a lane on which the vehicle travels, a vehicle-speed detector to detect a vehicle speed, and a controller to output a command signal to the steering-force generator based on detection results of the lane detector and the vehicle-speed detector, wherein the controller is configured to functionally comprise a first steering-force application control part for applying a first steering force to the steering wheel by means of the steering-force generator, a second steering-force application control part for applying a second steering force to the steering wheel by means of the steering-force generator, and a curvature-radius calculation part for calculating a radius of curvature of the lane, the first steering force is determined by a first steering characteristic which is operative to make the vehicle travel at a center of the lane, the second steering force is determined by a second steering characteristic, which is different from the first steering characteristic, which is operative to prevent the vehicle from deviating from the lane, in a case where the first steering characteristic and the second steering characteristic are shown by a characteristic diagram having two-dimensional coordinates with a horizontal axis as a position in a width direction of the lane and with a vertical axis as a magnitude of the steering force applied, the first steering characteristic includes a first steering-force increase part where the magnitude of the steering force gradually increases as the position changes from an inward side to an outward side in a width direction of the lane and the second steering characteristic includes a second steering-force increase part where the magnitude of the steering force gradually increases as the position changes from an inward side to an outward side in the width direction of the lane, and in a case where the vehicle travels at a curved portion of the lane, the first steering characteristic is set such that the position, in the width direction of the lane, of the first steering-force increase part changes according to the vehicle speed detected by the vehicle-speed detector in such a manner that the first steering-force increase part is located further outward in the width direction of the lane as the vehicle speed becomes higher and the second steering characteristic is set such that a magnitude of an upper limit of the second steering-force increase part changes according to the radius of curvature of the lane calculated by the curvature radius calculation part of the controller in such a manner that the magnitude of the upper limit becomes lower as the radius of curvature of the lane becomes smaller.

According to the present vehicle control device, since the first steering-force increase part is located further outward in the width direction of the lane as the vehicle speed becomes higher in the case where the vehicle travels at the curved portion of the lane, intervention of the steering assist at a center-side portion in the width direction of the lane can be suppressed in a case where the vehicle travels at the curved portion of the lane at a high speed. Accordingly, the intervention of the steering assist to the driver's steering is suppressed in the case where the vehicle travels at the curved portion of the lane at the high speed, so that it can be properly prevented that troublesome or uncomfortable feelings are given to the driver.

Further, since the magnitude of the upper limit of the second steering-force increase part becomes lower as the radius of curvature of the lane becomes smaller in the case where the vehicle travels at the curved portion of the lane, application of an excessively-large second steering force to the steering wheel is suppressed even in a case where the vehicle approaches the partition line at an end of the lane according to an operation of the driver. Accordingly, the application of the large second steering force is suppressed in the case where the vehicle travels at the curved portion of the lane having a small radius of curvature, so that it can be properly prevented that troublesome or uncomfortable feelings are given to the driver.

Moreover, since a relatively-large steering force is applied to the steering wheel in a case where the vehicle travels at the curved portion of the lane having a large radius of curvature, vehicle's lane departure prevention is so attained that the high safety can be secured.

Consequently, the vehicle control device of the present invention can properly prevent troublesome/uncomfortable feelings or stress from being given to the driver during the vehicle driving, securing the high safety by preventing the vehicle's lane departure.

In an embodiment of the present invention, the first steering characteristic is set in the case where the vehicle travels at the curved portion of the lane such that the magnitude of the first steering force determined by the first steering characteristic changes according to the vehicle speed detected by the vehicle-speed detector in such a manner that the higher the vehicle speed is, the smaller the magnitude of the first steering force is.

According to this embodiment, since the first steering characteristic is set such that the magnitude of the first steering force becomes smaller as the vehicle speed becomes higher, intervention of the lane keeping steering assist for making the vehicle travel at the center of the lane is suppressed in a case where the vehicle speed is high. Thus, according to the vehicle control device of this embodiment, the intervention of the steering assist to the driver's steering is suppressed in the case where the vehicle travels at the curved portion of the lane at the high speed, so that it can be properly prevented that troublesome or uncomfortable feelings are given to the driver.

In another embodiment of the present invention, the first steering characteristic is set in a case where the vehicle travels at the curved portion of the lane at the vehicle speed which is a specified speed or lower such that a decrease degree of the magnitude of the first steering force determined by the first steering characteristic at a center in the width direction of the lane changes according to the vehicle speed detected by the vehicle-speed detector in such a manner that the higher the vehicle speed is, the larger the decrease degree of the magnitude of the first steering force is.

According to this embodiment, since the first steering characteristic is set such that the decrease degree of the magnitude of the first steering force becomes larger as the vehicle speed becomes higher, the first steering force applied to the steering wheel at the center in the width direction of the lane can be made smaller as the vehicle speed becomes higher. That is, according to the vehicle control device of this embodiment, the magnitude of the first steering force is made smaller, not in a liner-function manner but in a quadratic-function manner, an exponential-function, or a logarithmic-function manner, as the vehicle speed becomes higher in the case where the vehicle travels at the curved portion of the lane, so that the intervention of the steering assist to the driver's steering is so more suppressed that it can be more properly prevented that troublesome or uncomfortable feelings are given to the driver.

In another embodiment of the present invention, the second steering characteristic is set in a case where the vehicle travels at the curved portion of the lane which has the radius of curvature between of a first specified curvature radius and a second specified curvature radius such that magnitude of the second steering force gradually changes according to the radius of curvature calculated by the curvature-radius calculation part of the controller.

According to this embodiment, since the second steering characteristic is set in the case where the radius of curvature of the curved portion of the lane is in a range from the first specified curvature radius to the second specified curvature radius such that the magnitude of the second steering force gradually changes according to the radius of curvature, it can be properly prevented, in a case of intervention of the steering assist, that troublesome or uncomfortable feelings are given to the driver, compared to a case where the magnitude of the second steering force rapidly changes at a certain radius of curvature, for example.

In another embodiment of the present invention, the second steering characteristic is set in a case where the vehicle travels at the curved portion of the lane which has the radius of curvature smaller than the first specified curvature radius such that the magnitude of the second steering force is zero.

According to this embodiment, since the magnitude of the second steering force is set at zero ("0") in the case where the radius of curvature of the curved portion of the lane on which the vehicle travels is smaller than the first specified curvature radius, in a case where the vehicle travels at an inside position, in the width direction, of the lane when traveling at a midway area, in an advancing direction, of the curved portion of the lane, for example, the second steering force is not applied, so that the driver can properly drive the vehicle on a desired path (route) which the driver imaged. Thus, according to the vehicle control device of this embodiment, it can be properly prevented that troublesome or uncomfortable feelings are given to the driver by invalidating the intervention of the steering assist in the case where the radius of curvature of the curved portion of the lane is smaller than the first specified curvature radius.

In another embodiment of the present invention, the second steering characteristic is set in a case where the vehicle travels at the curved portion of the lane which has the radius of curvature larger than the second specified curvature radius such that the magnitude of the second steering force is a specified steering force.

According to this embodiment, since the magnitude of the second steering force is set at the specified steering force which corresponds to the magnitude of its upper limit in the case the radius of curvature of the curved portion of the lane is larger than the second specified curvature radius, the second steering force larger than the above-described specified steering force is not applied to the steering wheel even in a case where the vehicle travels at the gently-curved portion of the lane. Thus, according to the vehicle control device of this embodiment, since application of the excessively-large second steering force to the steering wheel is avoided in the case where the vehicle travels at the gently-curved portion of the lane, it can be properly prevented that troublesome or uncomfortable feelings are given to the driver, attaining the vehicle's lane departure prevention.

In another embodiment of the present invention, in a case where the second steering characteristic is shown by a characteristic diagram having two-dimensional coordinates with a horizontal axis as the radius of curve of the curved portion of the lane and with a vertical axis as the magnitude of the second steering force, the second steering characteristic is set in a first specified area which is larger than the first specified curvature radius and a second specified area which is smaller than the second specified curvature radius such that the magnitude of the second steering force smoothly changes in a curved manner according to the radius of curvature of the curved portion of the lane.

According to this embodiment, since the second steering force is set such that its magnitude smoothly changes in the curved manner according to the radius of curvature of the curved portion of the lane in the first specified area and the second specified area of the characteristic diagram of the second steering characteristic, it can be prevented that the magnitude of the second steering force changes rapidly even in a case where the radius of curvature of the curved portion of the lane on which the vehicle travels changes. Thus, according to the vehicle control device of this embodiment, it can be more securely prevented that troublesome or uncomfortable feelings are given to the driver in the case where the vehicle travels at the curved portion of the lane.

In another embodiment of the present invention, the vehicle control device further comprises an operational-force detector to detect a magnitude of an operational force of a driver who operates the steering wheel, wherein the controller is configured to output the command signal to the steering-force generator based on detection results of the lane detector, the vehicle-speed detector, and the operational-force detector, and the controller is configured such that application of the first steering force to the steering wheel which is executed by the first steering-force application control part of the controller is invalidated in a case where the magnitude of the operational force detected by the operational-force detector is a specified operational force or larger.

According to this embodiment, the application of the first steering force to the steering wheel is invalidated in the case where the magnitude of the operational force of the driver is the specified operational force or larger, thereby giving priority to operation of the driver. That is, when the driver operates the steering wheel with the large operational force in the case where the vehicle travels at the curved portion of the lane, since the application of the first steering force for the lane keeping steering assist is invalidated, the vehicle can be made travel on a smooth path (route) at the curved portion of the lane by the operation of the driver.

Another aspect of the present invention is a vehicle control method for applying a steering force to a steering wheel of a vehicle according to a vehicle traveling condition, comprising steps of detecting a lane on which the vehicle travels, detecting a vehicle speed, and applying the steering force to the steering wheel based on detection results of the lane detection step and the vehicle-speed detection step, wherein the steering-force application step comprises a first steering-force application sub step of applying a first steering force to the steering wheel, a second steering-force application sub step of applying a second steering force to the steering wheel, and a curvature-radius calculation sub step of calculating a radius of curvature of the lane, the first steering force is determined by a first steering characteristic which is operative to make the vehicle travel at a center of the lane, the second steering force is determined by a second steering characteristic, which is different from the first steering characteristic, which is operative to prevent the vehicle from deviating from the lane, in a case where the first steering characteristic and the second steering characteristic are shown by a characteristic diagram having two-dimensional coordinates with a horizontal axis as a position in a width direction of the lane and with a vertical axis as a magnitude of the steering force applied, the first steering characteristic includes a first steering-force increase part where the magnitude of the steering force gradually increases as the position changes from an inward side to an outward side in a width direction of the lane and the second steering characteristic includes a second steering-force increase part where the magnitude of the steering force gradually increases as the position changes from an inward side to an outward side in the width direction of the lane, and in a case where the vehicle travels at a curved portion of the lane, the first steering characteristic is set such that the position, in the width direction of the lane, of the first steering-force increase part changes according to the vehicle speed detected by the vehicle-speed detector in such a manner that the first steering-force increase part is located further outward in the width direction of the lane as the vehicle speed becomes higher and the second steering characteristic is set such that a magnitude of an upper limit of the second steering-force increase part changes according to the radius of curvature of the lane calculated by the curvature radius calculation part of the controller in such a manner that the magnitude of the upper limit becomes lower as the radius of curvature of the lane becomes smaller.

According to the present vehicle control method, since the first steering-force increase part is located further outward in the width direction of the lane as the vehicle speed becomes higher in the case where the vehicle travels at the curved portion of the lane, intervention of the steering assist at a center-side portion in the width direction of the lane can be suppressed in a case where the vehicle travels at the curved portion of the lane at a high speed. Accordingly, the intervention of the steering assist to the driver's steering is suppressed in the case where the vehicle travels at the curved portion of the lane at the high speed, so that the driver can easily drive the vehicle on a desired path (route) which the driver imaged and therefore it can be properly prevented that troublesome or uncomfortable feelings are given to the driver.

Further, since the magnitude of the upper limit of the second steering-force increase part becomes lower as the radius of curvature of the lane becomes smaller in the case where the vehicle travels at the curved portion of the lane, application of an excessively-large second steering force to the steering wheel is suppressed even in a case where the vehicle approaches the partition line at an end of the lane according to an operation of the driver. Accordingly, the application of the large second steering force is suppressed in the case where the vehicle travels at the curved portion of the lane having a small radius of curvature, so that it can be properly prevented that troublesome or uncomfortable feelings are given to the driver.

Moreover, since a relatively-large steering force is applied to the steering wheel in a case where the vehicle travels at the curved portion of the lane having a large radius of curvature, vehicle's lane departure prevention is so attained that the high safety can be secured.

Consequently, the vehicle control method of the present invention can properly prevent troublesome/uncomfortable feelings or stress from being given to the driver during the vehicle driving, securing the high safety by preventing the vehicle's lane departure.

In an embodiment of the present vehicle control method, the first steering characteristic is set in the case where the vehicle travels at the curved portion of the lane such that the magnitude of the first steering force determined by the first steering characteristic changes according to the vehicle speed detected by the vehicle-speed detector in such a manner that the higher the vehicle speed is, the smaller the magnitude of the first steering force is.

According to this embodiment, since the first steering characteristic is set such that the magnitude of the first steering force becomes smaller as the vehicle speed becomes higher, intervention of the lane keeping steering assist for making the vehicle travel at the center of the lane is suppressed in a case where the vehicle speed is high. Thus, according to the vehicle control method of this embodiment, the intervention of the steering assist to the driver's steering is suppressed in the case where the vehicle travels at the curved portion of the lane at the high speed, so that it can be properly prevented that troublesome or uncomfortable feelings are given to the driver.

In another embodiment of the present vehicle control method, the first steering characteristic is set in a case where the vehicle travels at the curved portion of the lane at the vehicle speed which is a specified speed or lower such that a decrease degree of the magnitude of the first steering force determined by the first steering characteristic at a center in the width direction of the lane changes according to the vehicle speed detected by the vehicle-speed detector in such a manner that the higher the vehicle speed is, the larger the decrease degree of the magnitude of the first steering force is.

According to this embodiment, since the first steering characteristic is set such that the decrease degree of the magnitude of the first steering force becomes larger as the vehicle speed becomes higher, the first steering force applied to the steering wheel at the center in the width direction of the lane can be made smaller as the vehicle speed becomes higher. That is, according to the vehicle control method of this embodiment, the magnitude of the first steering torque is made smaller, not in the liner-function manner but in the quadratic-function manner, the exponential-function, or the logarithmic-function manner, as the vehicle speed becomes higher in the case where the vehicle travels at the curved portion of the lane, so that the intervention of the steering assist to the driver's steering is so more suppressed that it can be more properly prevented that troublesome or uncomfortable feelings are given to the driver.

Other features, aspects, and advantages of the present invention will become apparent from the following description which refers to the accompanying drawings.

DETAILED DESCRIPTION OF THE INVENTION

Figure 1:
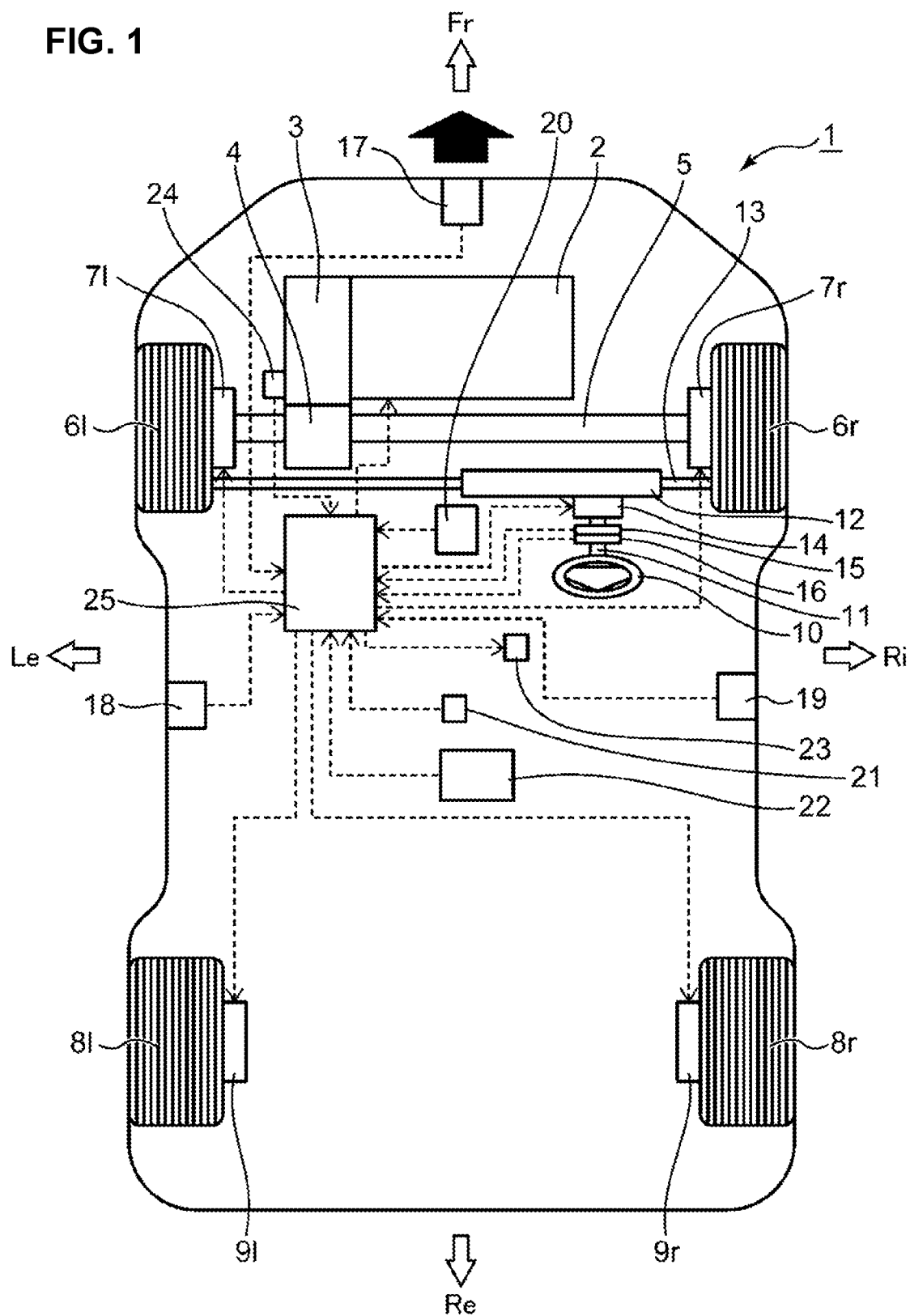
FIG. 1 is a schematic diagram showing a schematic configuration of a vehicle according to an embodiment of the present invention.

Hereafter, an embodiment and its modified examples of the present invention will be described referring to the drawings. These are merely examples of the present invention, and therefore the present invention should not be substantially limited to these.

In the figures used in the flowing description, "Fr" shows a forward direction (advancing direction) of an own vehicle, "Re" shows a rearward direction of the own vehicle, "Le" shows a leftward direction of the own vehicle, and "Ri" shows a rightward direction of the own vehicle, Embodiment 1. Schematic Configuration of Vehicle 1

A schematic configuration of a vehicle 1 according to the present embodiment will be described referring to FIGS. 1 and 2.

As shown in FIG. 1, the vehicle 1 comprises an engine 2 as a power (drive) source. A multi-cylinder gasoline engine is applied to the vehicle 1 of the present embodiment as an example of the engine 2.

A transmission 3 is coupled to the engine 2, and a deferential gear 4 is connected to the transmission 3. A drive shaft 5 extends in a lateral direction from the deferential gear 4. Right and left front wheels 6*l*, 6*r* are attached to end portions of the drive shaft 5.

The drive shaft 5 is provided with a left front brake 7*l* positioned near the left front wheel 6*l* and a right front brake 7*r* positioned near the right front wheel 6*r*.

Right and left rear wheels 8*l*, 8*r* are arranged at a rearward side of the vehicle 1. The right and left rear wheels 8*l*, 8*r* are respectively attached to rear frames, not illustrated. A left rear brake 9*l* is provided at a shaft (not illustrated) which rotatably supports the left rear wheel 8*l*, and a right rear brake 9*r* is provided at a shaft (not illustrated) which rotatably supports the right rear wheel 8*r*.

As shown in FIG. 1, a steering wheel 10 is provided in front of a driver's seat in a cabin of the vehicle 1. The steering wheel 10 is attached to a tip portion of a steering shaft 11. The other end of the steering shaft 11 is connected to a steering gear 12. Further, a steering actuator 14 is coupled to the steering shaft 11, whereby a steering torque (steering force) is applicable to the steering wheel 10 by way of the steering shaft 11. That is, the steering actuator 14 serves as a steering-force generator which generates the steering force.

Further, to the steering shaft 11 are attached a steering-angle sensor 15 to detect a steering angle and a torque sensor 16 to detect a steering torque of the steering wheel 10 which is operated by a driver. The torque sensor 16 serves as an operational-force detector in the vehicle 1.

Moreover, a tie rod 13 is coupled to the steering gear 12. A direction of the front wheels 6*l*, 6*r* is changed according to a lateral move of the tie rod 13.

As shown in FIG. 1, the vehicle 1 is provided with three radars 17, 18, 19 and an outside-monitor camera 20. The radar 17 is arranged at a front portion of the vehicle 1, and the other radars 18, 19 are arranged at both side portions of the vehicle 1. These radars 17, 18, 19 are configured to detect another vehicle located around the own vehicle (vehicle 1) and a relative speed and distance between the own vehicle 1 and the other vehicle located around the vehicle 1.

The outside-monitor camera 20 detects both-side partition lines of a lane on which the vehicle 1 travels, whereby the lane on which the vehicle 1 travels is detected. That is, in the vehicle 1 according to the present embodiment, the outside-monitor camera 20 serves as a lane detector.

Further, the vehicle 1 is provided with a yaw-rate sensor 21. Herein, detection results of the torque sensor 16 and the yaw-rate sensor 21 are used for calculation of the radius of curvature of a curved portion of the lane LN in the case where the vehicle 1 travels at the curved portion of the lane LN.

Further, the vehicle 1 is provided with a map-information storage 22. The map-information storage 22 stores information of roads on which the vehicle 1 travels and the like. The map information stored in the map-information storage 22 includes lane information of the roads.

Herein, the map-information storage 22 may have the function of communicating with a server provided outside, so that the vehicle 1 may be configured to obtain the road information and the like from the server through its successive communication.

Further, the vehicle 1 is provided with an alarm 23 which is capable of generating an alarm to a passenger.

A vehicle-speed sensor 24 to detect a vehicle speed of the vehicle 1 is coupled to an output shaft (not illustrated) of the transmission 3 of the vehicle 1. That is, the vehicle-speed sensor 24 serves as a vehicle-speed detector in the vehicle 1.

Further, the vehicle 1 is provided with a control unit 25. The control unit 25 incudes a microprocessor which comprises CPU, ROM, RAM and so on. As shown in FIGS. 1 and 2, the outside-monitor camera 20, the steering-angle sensor 15, the radars 17, 18, 19, the torque sensor 16, the yaw-rate sensor 21, the vehicle-speed sensor 24, the map-information storage 22, and others are connected to the control unit 25, so that the control unit 25 receives various kinds of information from these.

The control unit 25 is configured to output command signals to the steering actuator 14 and the alarm 23 based on the received information.

Figure 2:
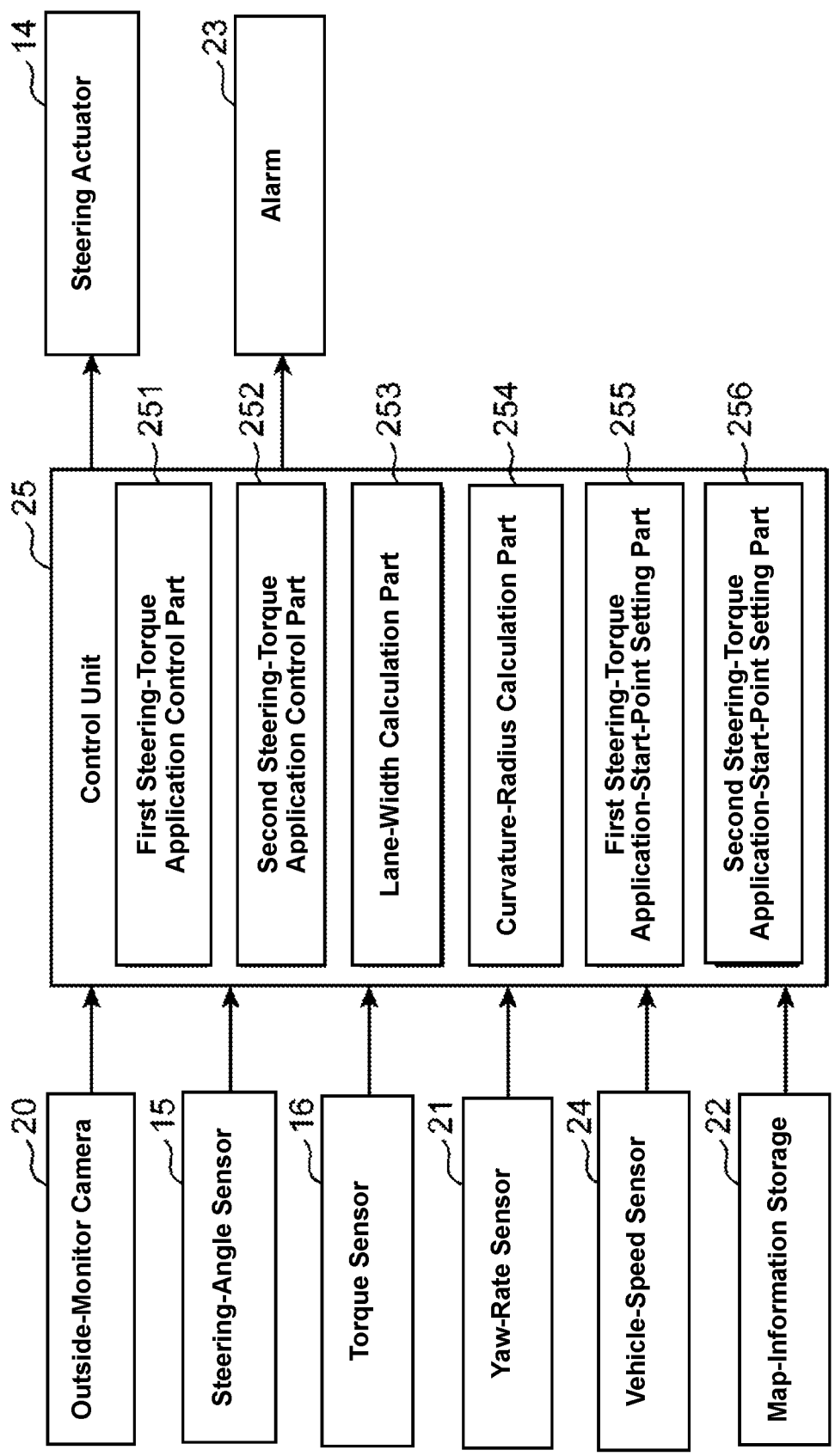
FIG. 2 is a bock diagram of a control of the vehicle.

Further, as shown in FIG. 2, the control unit 25 is configured to functionally comprise a first steering-torque (steering-force) application control part 251, a second steering-torque (steering-force) application control part 252, a lane-width calculation part 253, a curvature-radius calculation part 254, a first steering-torque application-start-point setting part 255, and a second steering-torque application-start-point setting part 256, which will be described specifically.

The control unit 25 serves as a controller of the vehicle 1.

2. Detection of Lane LN by Outside-Monitor Camera 20

Figure 3:
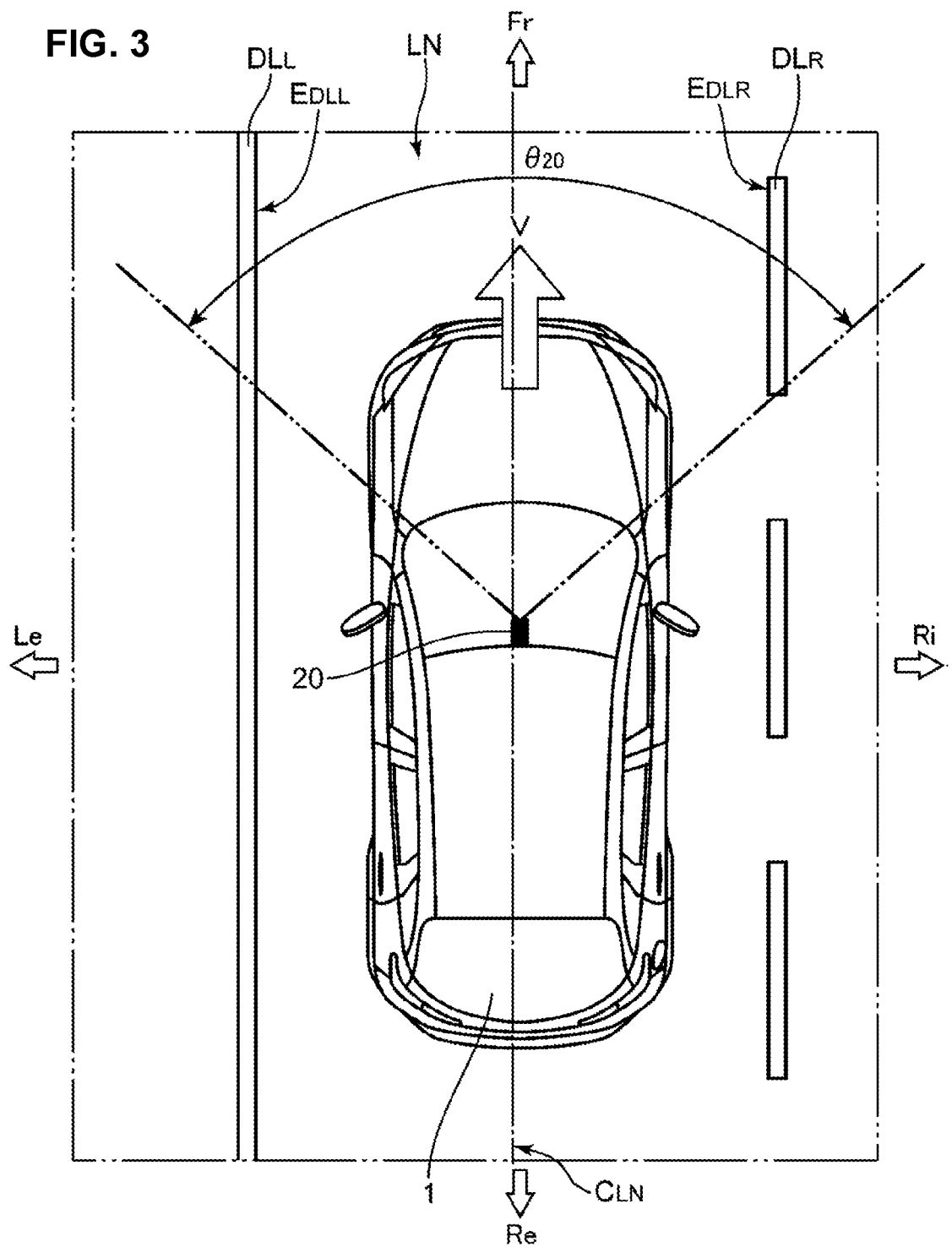
FIG. 3 is a schematic diagram for explaining detection of a lane by an outside-monitor camera.

Detection of a lane LN by the outside-monitor camera 20 will be described referring to FIG. 3. FIG. 3 is a schematic diagram for explaining the detection of the lane LN by the outside-monitor camera 20.

As shown in FIG. 3, the outside-monitor camera 20 which is provided behind a windshield of the vehicle 1 inside the cabin is capable of detecting a forward range $\theta_{20}$ of the vehicle 1.

In the present embodiment, a left-side partition line (a roadway outside line) DLL is provided at a left side of the lane LN, and a right-side partition line (a roadway center line) $DL_R$ is provided at a right side of the lane LN.

The outside-monitor camera 20 can detect the left-side partition line DLL and the right-side partition line $DL_R$ at least. Herein, the outside-monitor camera 20 can detect respective inner ends $E_{DLL}$, $E_{DLR}$ of the partition lines $DL_L$, $DL_R$ as well.

The outside-monitor camera 20 executes the detection of the lane LN by detecting the left-side partition line $DL_L$ and the right-side partition line $DL_R$.

In the lane LN according to the present embodiment, an imaginary line, which passes through a central point between the inner end $E_{DLL}$ of the left-side partition line $DL_L$ and the inner end $E_{DLR}$ of the right-side partition line $DL_R$ and is parallel to both of the inner end $E_{DLL}$ of the left-side partition line $DL_L$ and the inner end $E_{DLR}$ of the right-side partition line $DL_R$, is defined as a lane center $C_{LN}$.

3. Traveling Condition of Vehicle 1

Figure 4:
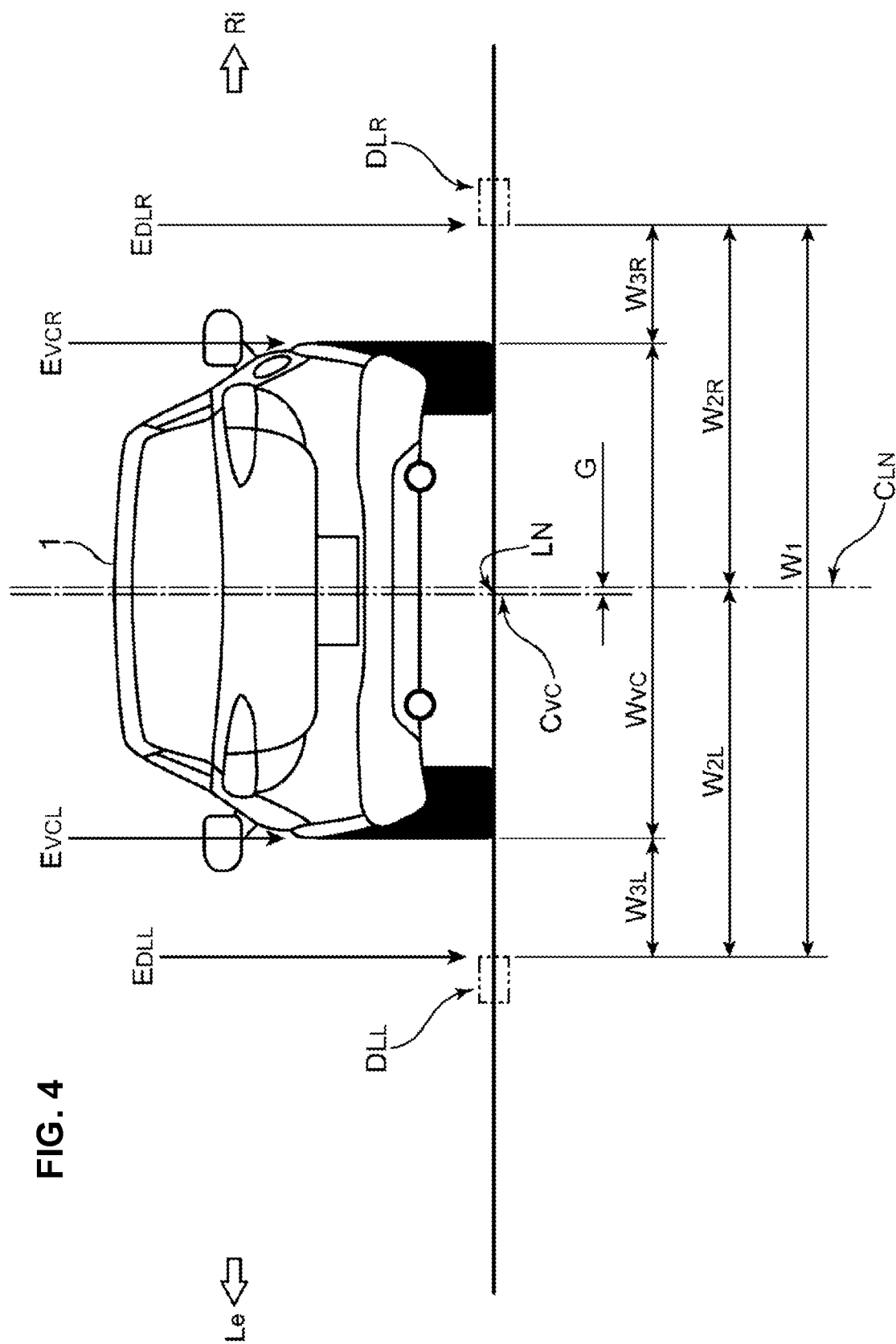
FIG. 4 is a schematic back view showing a vehicle position in a width direction of the lane.

Next, an example of the traveling condition of the vehicle 1 will be described referring to FIG. 4. FIG. 4 is a schematic back view of the vehicle 1, which shows a relative position of the vehicle 1 to the partition lines $DL_L$, $DL_R$.

As shown in FIG. 4, the lane-width calculation part 253 of the control unit 25 calculates a width $W_1$ between the inner end $E_{DLL}$ of the left-side partition line $DL_L$ and the inner end $E_{DLR}$ of the right-side partition line $DL_R$ based on results of images picked up by the outside-monitor camera 20. This lane-width calculation part 253 calculates right-and-left half widths $W_{2L}$, $W_{2R}$ of the lane LN from the width $W_1$ of the lane LN as well.

Further, the control unit 25 calculates a positional-displacement quantity G of a vehicle center $C_{VC}$ of the vehicle 1 relative to the lane center $C_{LN}$ of the lane LN based on the picket-up image results from the outside-monitor camera 20 and stored information of the map-information storage 22. Further, a distance $W_{3L}$ between a vehicle left-side end $E_{VCL}$ and the inner end $E_{DLL}$ of the left-side partition line $DL_L$ and a distance $W_{3R}$ between a vehicle right-side end $E_{VCR}$ and the inner end $E_{DLR}$ of the right-side partition line $DL_R$ are calculated from this calculation result and a vehicle width $W_{VC}$ of the vehicle 1.

Herein, the distance $W_{3L}$ and the distance $W_{3R}$ satisfy the following formula in a state where the lane center $C_{LN}$ of the lane LN and the vehicle center $C_{VC}$ of the vehicle 1 coincide with each other.

$$W_{3L}=W_{3R} \quad \text{(formula 1)}$$

Further, in the present embodiment, a positional-displacement quantity $G_{MAX}$ (allowed positional-displacement quantity) in a state where the vehicle left-side end $E_{VCL}$ and the inner end $E_{DLL}$ of the left-side partition line $DL_L$ coincide with each other and in a state where the vehicle right-side end $E_{VCR}$ and the inner end $E_{DLR}$ of the right-side partition line $DL_R$ coincide with each other is defined as follows.

$$G_{MAX}=(W_1-W_{VC})/2 \quad \text{(formula 2)}$$

The first steering-torque application control part 251 and the second steering-torque application control part 252 of the control unit 25 command the steering actuator 14 to execute the steering-torque application based on the positional-displacement quantity G and the distances $W_{3L}$, $W_{3R}$ which are calculated as above and a vehicle speed V of the vehicle 1.

4. Traveling State where Vehicle 1 Travels at Curved Portion of Lane LN

Figure 5:
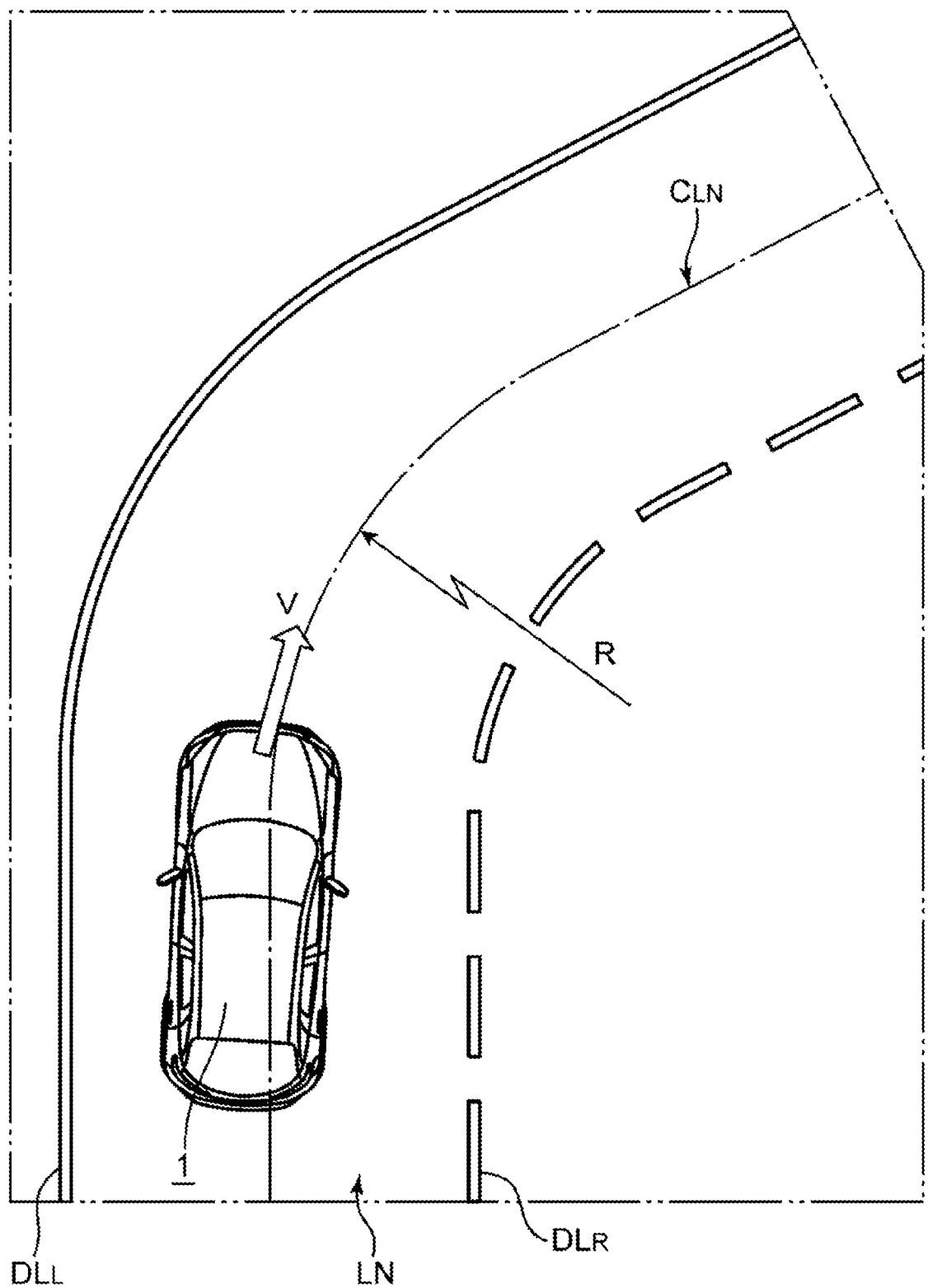
FIG. 5 is a schematic plan view showing the vehicle traveling at a curved portion of the lane from above.

Next, an example of a traveling state (condition) of the vehicle 1 traveling at the curved portion of the lane LN will be described referring to FIG. 5. FIG. 5 is a schematic plan view showing the vehicle 1 traveling at the curved portion of the lane LN from above. FIG. 5 exemplifies the traveling state (condition) where the vehicle 1 travels at a curved portion of the lane LN which is curved to the right.

As show in FIG. 5, the traveling condition can be got from the picked-up image results of the outside-monitor camera 20, the stored information of the map-information storage 22, and others when the vehicle 1 travels at the curved portion of the lane LN. The curvature-radius calculation part 254 of the control unit 25 calculates a radius of curvature R of the curved portion by using detection results of the steering-angle sensor 15 and the yaw-rate sensor 21 additionally to the picked-up image results of the outside-monitor camera 20 and the stored information of the map-information storage 22.

As show in FIG. 5, the vehicle 1 calculates a radius of curvature of the lane center $C_{LN}$ of the lane LN as the "radius of curvature R" according to the present embodiment.

Herein, while the curvature-radius calculation part 254 uses the respective detection results of the steering-angle sensor 15 and the yaw-rate sensor 21 as well in calculation of the radius of curvature R as described above, weighting is applied to the respective detection results of the steering-angle sensor 15 and the yaw-rate sensor 21 according to the vehicle speed V of the vehicle 1, which will be described later.

5. Setting of First Steering Characteristic CH1 and Second Steering Characteristic CH2 by Control unit 25

Figure 6:
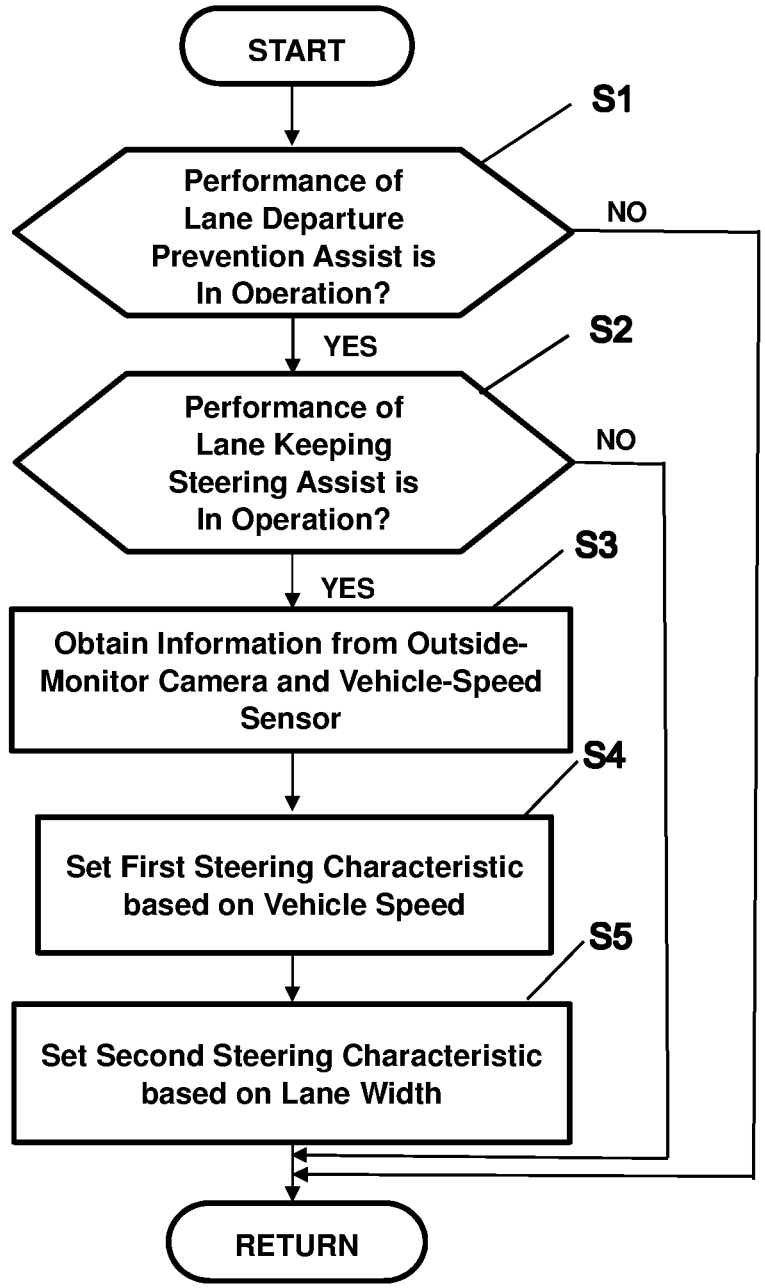
FIG. 6 is a flowchart of a setting method of first and second steering characteristics, which is executed by a controller.

Setting of the first steering characteristic CH1 and the second steering characteristic CH2 executed by the control unit 25 will be described referring to FIGS. 6 and 7. FIG. 6 is a flowchart of a setting method of the steering characteristics which is executed by the control unit 25, and FIG. 7 is a characteristic diagram showing an example of a relationship between the vehicle position in the width direction of the lane LN and the first and second steering characteristics CH1, CH2.

Figure 7:
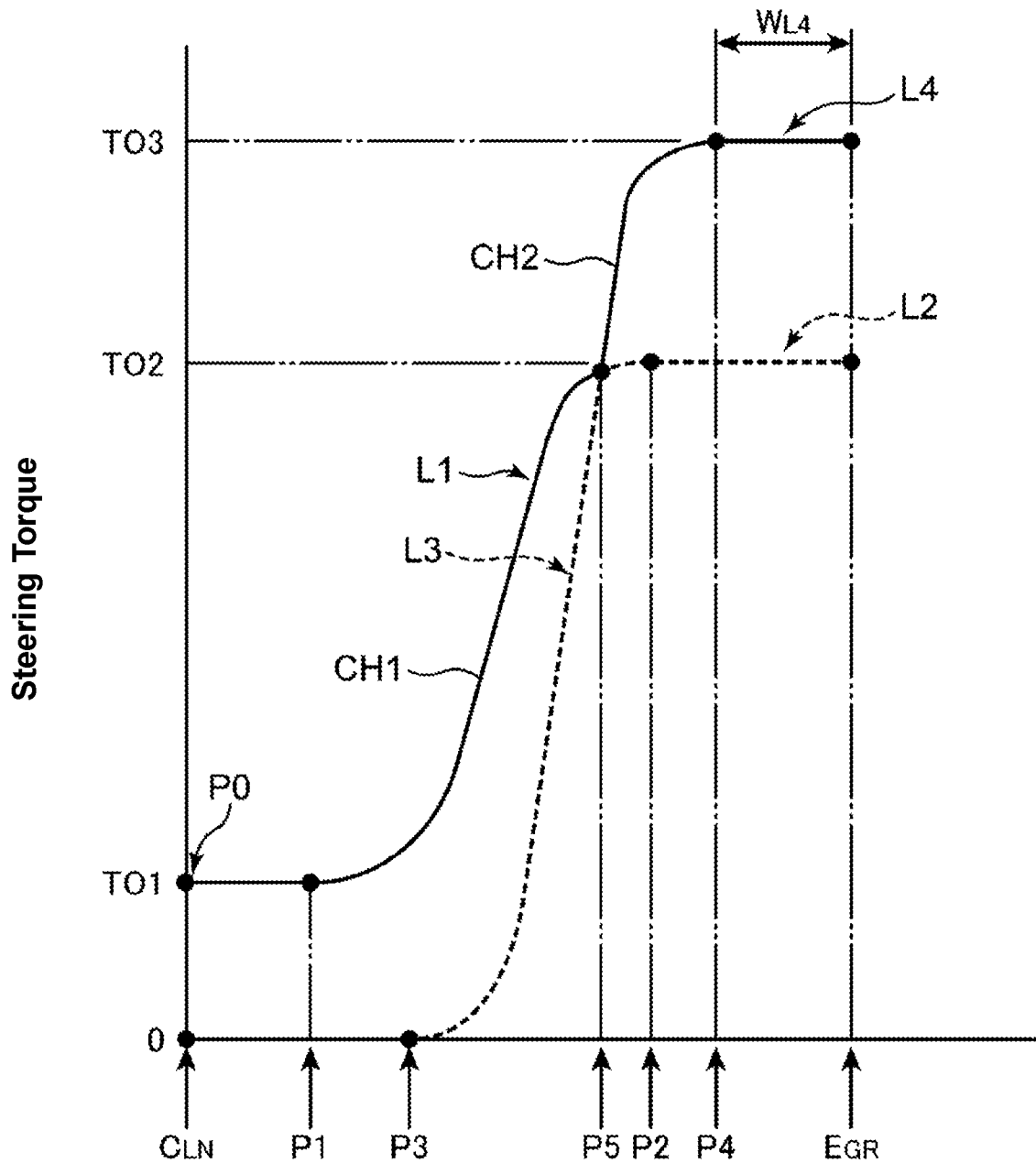
FIG. 7 is a characteristic diagram showing one example of a relationship between the vehicle position in the width direction of the lane and the first and second steering characteristics.

In FIG. 7, "$E_{GR}$" shows a position which is away from the lane center $C_{LN}$ of the lane LN by the allowed positional-displacement quantity $G_{MAX}$ to the right side, which will be referred to as "allowed right-end point $E_{GR}$" in the following description.

As shown in FIG. 6, the control unit 25 determines whether respective performances of the lane departure prevention assist and the lane keeping steering assist are in operation or not (step S1, step S2). These determinations are provided, considering a possibility that a vehicle driver can selectively cancel either one or both of the above-described assist performances.

In a case where it is determined that at least one of the performances of the lane departure prevention assist and the lane keeping steering assist is not in operation (i.e., cancelled) (NO in the step S1, NO in the step S2), a control sequence of the control unit 25 is returned.

Meanwhile, in a case where it is determined that both of the performances of the lane departure prevention assist and the lane keeping steering assist are in operation, information (detection results) from the outside-monitor camera 20 and the vehicle-speed sensor 24 are obtained (step S3).

As described above, the lane-width calculation part 253 of the control unit 25 calculates the width $W_1$ of the lane LN, the allowed positional-displacement quantity $G_{MAX}$ of the above-described (formula 2), and so on based on the detection results of the outside-monitor camera 20.

Next, the first steering-torque application control part 251 of the control unit 25 sets the first steering characteristic CH1 based on the detection results (the vehicle speed V of the vehicle 1) of the vehicle-speed sensor 24 (step S4). The first steering characteristic CH1 is a characteristic to define the steering torque applied to the steering wheel 10 of the vehicle 1 for making the vehicle 1 travel at a center of the lane (i.e., for the lane keeping steering assist), which is set, as shown in FIG. 7 as one example, such that a magnitude of torque between a first torque TO1 and a second torque TO2 is set for each position in the width direction of the lane.

Specifically, in the first steering characteristic CH1 shown in FIG. 7, a first steering-torque application-start point P0 is set at the lane center $C_{LN}$ of the lane LN by the first steering-torque application-start-point setting part 255. Further, the first steering characteristic CH1 is set such that the first torque TO1 is applied in a case where the vehicle center $C_{VC}$ is positioned between the lane center $C_{LN}$ and an outside point P1 in the width direction of the lane LN.

The first steering characteristic CH1 shown in FIG. 7 is set such that the magnitude of steering torque gradually change from the first torque TO1 to the second torque TO2 in a case where the vehicle center $C_{VC}$ is positioned between the above-described point P1 and a point P2 which is located on a further outside in the width direction of the lane LN. That is, a torque increase part (first steering-force increase part) L1 is set between the point P1 and the point P2. Meanwhile, in a case where the vehicle center $C_{VC}$ is positioned between the above-described point P2 and the allowed right-end point $E_{GR}$, the first steering characteristic CH1 is set such that the second torque TO2 is maintained. That is, a torque maintenance part L2 is set between the point P1 and the allowed right-end point $E_{GR}$.

Herein, as shown in FIG. 7, the first steering characteristic CH1 is set such that in its partial area located on the outside of the point P1 and its partial area located on the inside of the point P2, the magnitude of the steering torque changes not in a liner-function manner but in a quadratic-function manner, an exponential-function, or a logarithmic-function manner.

Returning to FIG. 6, the second steering-torque application control part 252 of the control unit 25 sets the second steering characteristic CH2 based on the lane width Wi calculated by the lane-width calculation part 253 (step S5). The second steering characteristic CH2 is a characteristic to define the steering torque applied to the steering wheel 10 of the vehicle 1 for preventing the lane departure of the vehicle 1 (i.e., for the lane departure prevention assist), which is set, as shown in FIG. 7 as one example, such that a magnitude of torque having an upper limit of a third torque TO3 is set for each position in the width direction of the lane.

Specifically, in the first steering characteristic CH2 shown in FIG. 7, a second steering-torque application-start point P3 is set at a midway point in the width direction of the lane LN by the second steering-torque application-start-point setting part 256. Further, the second steering characteristic CH2 shown in FIG. 7 is set such that the magnitude of the steering torque gradually changes from "0" to the third torque TO3 in a case where the vehicle center $C_{VC}$ is positioned between the second steering-torque application-start point P3 and a point P4 which is located on the outside of the point P3. Meanwhile, in a case where the vehicle center $C_{VC}$ is positioned between the above-described point P4 and the allowed right-end point $E_{GR}$, the second steering characteristic CH2 is set such that the magnitude of the third torque TO3 is maintained. That is, a torque maintenance part L4 is set between the point P4 and the allowed right-end point $E_{GR}$. The torque maintenance part L4 is set at an area of a width $W_{L4}$ which is located on an inside of the allowed right-end point $E_{GR}$. In the present embodiment, this width $W_{L4}$ is set within 30-50 cm (40 cm for example).

Herein, as shown in FIG. 7, the second steering characteristic CH2 is also set such that in its partial area located on the outside of the second steering-torque application-start point P3 and its partial area located on the inside of the point P4, the magnitude of the steering torque changes not in the liner-function manner but in the quadratic-function manner, the exponential-function, or the logarithmic-function manner.

While the examples of the first steering characteristic CH1 and the second steering characteristic CH2 have been described referring to FIG. 7 for a case where the vehicle center $C_{VC}$ is positioned in the area from the lane center $C_{LN}$ of the lane LN to the allowed right-end point $E_{GR}$, these characteristics CH1, CH2 are set such that their left parts for a case where the vehicle center $C_{VC}$ is positioned in the area from the lane center $C_{LN}$ of the lane LN to an allowed left-end point is symmetrical to the right parts shown in FIG. 6.

The above-described allowed left-end point means a position which is located away from the lane center $C_{LN}$ of the lane LN by the above-described allowed positional-displacement quantity $G_{MAX}$ to the left side, which is symmetrical to the allowed right-end point $E_{GR}$ in relation to the lane center $C_{LN}$.

6. Steering Torques ST1, ST2 Applied to Steering Wheel 10 of Vehicle 1

A relationship between the position, in the width direction of the lane LN, of the vehicle 1 and steering torques ST1, ST2 applied to the steering wheel 10 of the vehicle 1 will be described referring to FIGS. 7 and 8A, B. FIG. 8A is a schematic plan view showing a case where the vehicle 1 is located to the right of the lane center $C_{LN}$, and FIG. 8B is a schematic plan view showing a case where the vehicle 1 is located further to the right of the lane center $C_{LN}$.

First, a situation shown in FIG. 8A where the vehicle center $C_{VC}$ of the vehicle 1 traveling at a vehicle speed V1 is displaced to the right (an arrow A) from the lane center $C_{LN}$ of the lane LN by a positional-displacement quantity G1 is supposed. The positional-displacement quantity G1 of the vehicle center $C_{VC}$ is a displacement quantity between the lane center $C_{LN}$ and a cross point of the first steering characteristic CH1 and the second steering characteristic CH2 (a characteristic exchange point P5) shown in FIG. 7.

According to the situation shown in FIG. 8A, the steering torque ST1 determined by the first steering characteristic CH1 is applied to the steering wheel 10 of the vehicle 1. Thereby, the vehicle 1 is controlled (assisted) so that the vehicle center $C_{VC}$ can be returned to the lane center $C_{LN}$ of the lane LN.

Figure 8B:
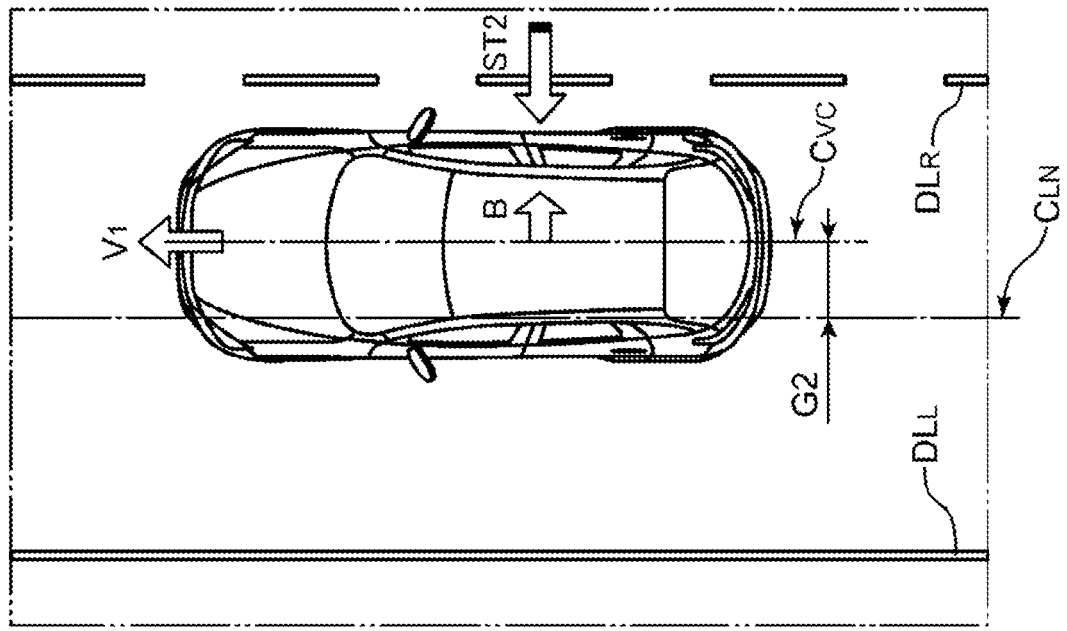
FIG. 8B is a schematic plan view showing a case where the vehicle is located further to the right of center.
Figure 8A:
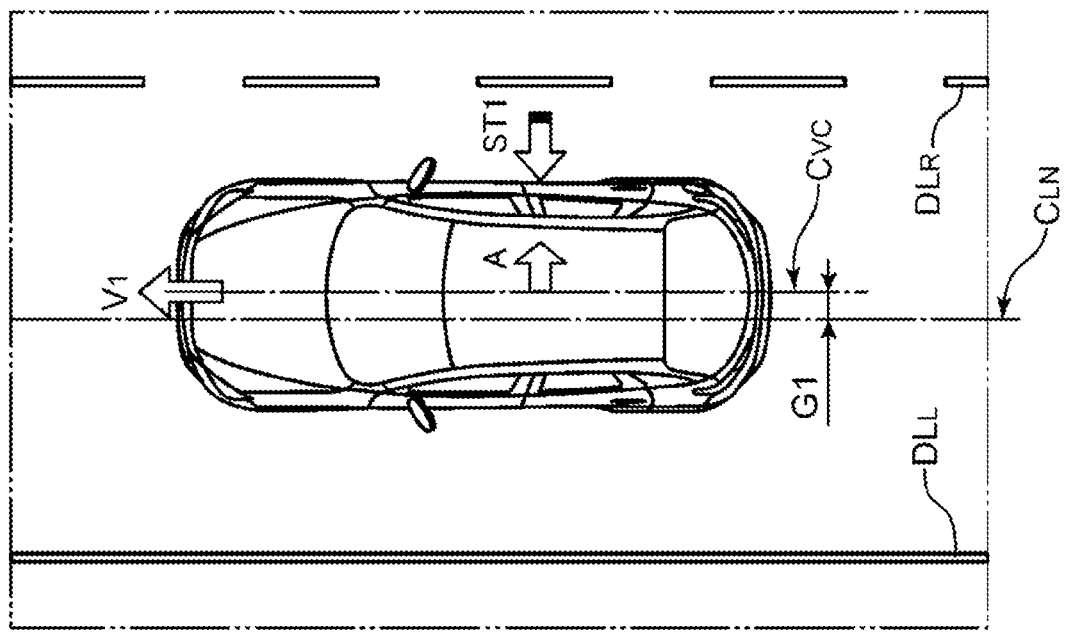
FIG. 8A is a schematic plan view showing a case where the vehicle is located to the right of center.

Next, a situation shown in FIG. 8B where the vehicle center $C_{VC}$ of the vehicle 1 is displaced further to the right (an arrow B) from the lane center $C_{LN}$ of the lane LN by a positional-displacement quantity G2 is supposed. The positional-displacement quantity G2 of the vehicle center $C_{VC}$ is a displacement quantity between the characteristic exchange point P5 and the allowed right-end point $E_{GR}$ shown in FIG. 6.

According to the situation in FIG. 8B, the steering torque ST2 determined by the second steering characteristic CH2 is applied to the steering wheel 10 of the vehicle 1. Thereby, the vehicle 1 is controlled (assisted) so that the vehicle right-side end $E_{VCR}$ can be prevented from deviating from the right-side partition line $DL_R$ to the outside.

7. Relationship between Vehicle Speed V of Vehicle 1 and First Steering Characteristic CH1

Figure 9:
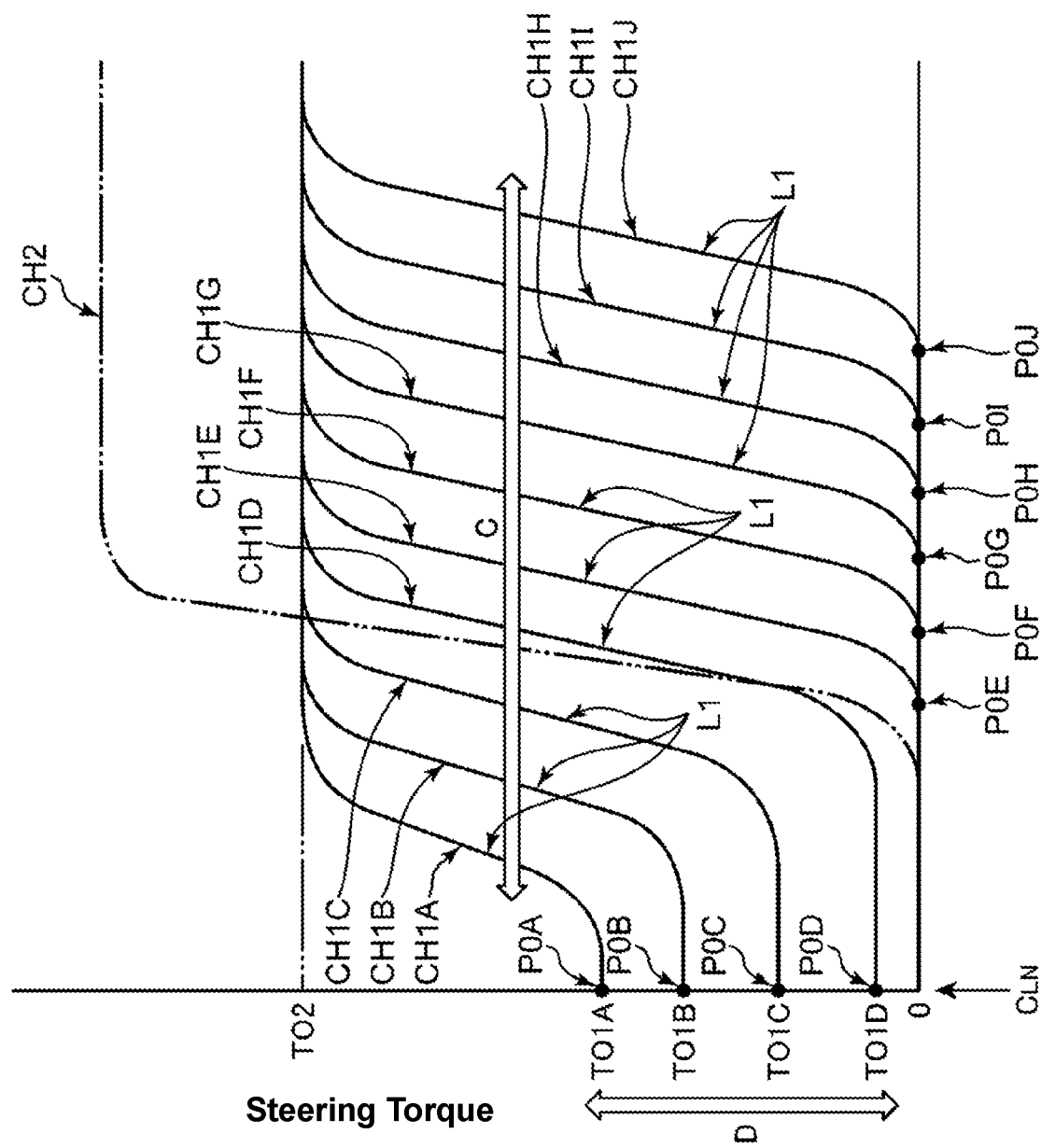
FIG. 9 is a characteristic diagram showing a relationship between a vehicle speed and the set first steering characteristic.

A relationship between the vehicle speed V of the vehicle 1 and the set first steering characteristic CH1 will be described referring to FIG. 9. FIG. 9 is a characteristic diagram showing the relationship between the vehicle speed V of the vehicle 1 and the set first steering characteristic CH1.

As shown in FIG. 9, in the vehicle 1 according to the present embodiment, the set first steering characteristic CH1 changes according to the vehicle speed V of the vehicle 1 in a manner of CH1A-CH1J (an arrow C). Herein, while the first steering characteristic CH1 changing according to the vehicle speed V is shown in FIG. 9 by picking up characteristics CH1A-CH1J, the first steering characteristic CH1 is configured such that there exist other characteristics between adjacent characteristics and also on a low-speed side of the characteristic CH1A or on a high-speed side of the characteristic CH1J.

Specifically, the first steering characteristic CH1 is set such that the torque increase part L1 is located further outward in the width direction of the lane LN as the vehicle speed V becomes higher. In other words, the first steering characteristic CH1 is set, at any point in the width direction of the lane LN, such the higher the vehicle speed V is, the lower the magnitude of the steering torque is.

As shown in FIG. 9, in a case where the vehicle speed V is in a relatively-low speed range, the characteristics CH1A-CH1D of the first steering characteristic CH1 are set such that the first steering-torque application-start point PO changes according to the vehicle speed V in a manner of P0A-P0D which are positioned at the lane center $C_{LN}$.

These characteristics CH1A-CH1D of the first steering characteristic CH1 gradually change in a manner of CH1A→CH1B→CH1C→CH1D as the vehicle speed V increases in the case where the vehicle speed V is in the relatively-low speed range (when the vehicle speed V is a specified speed related to setting of the characteristic CH1D or lower).

Herein, as shown in FIG. 9, the first steering torque TO1 changes in a manner of TO1A→TO1B→TO1C→TO1D shown by an arrow D as the vehicle speed V increases even in the case where the vehicle speed V is in the relatively-low speed range.

In the present embodiment, the vehicle speed between the vehicle speed V related to setting of the characteristic CH1D and the vehicle speed V related to setting of the characteristic CH1E corresponds to a "specified speed."

In a case where the vehicle speed V is in a relatively-high speed range (when the vehicle speed V is another specified speed related to setting of the characteristic CH1E or higher), the characteristics CH1E-CH1J of the first steering characteristic CH1 are set such that the first steering-torque application-start point PO gradually changes in the width direction of the lane LN in a manner of P0E-P0J.

These characteristics CH1E-CH1J of the first steering characteristic CH1 gradually change in a manner of CH1E→CH1F→CH1G→CH1H→CH1I→CH1J as the vehicle speed V increases even in the case where the vehicle speed V is in the relatively-high speed range.

In the present embodiment, as one example, the first steering characteristic CH1 is configured such that the characteristics CH1A, CH1B, CH1C, CH1D, CH1E, CH1F, CH1G, CH1H, CH1I, CH1J correspond to the vehicle speeds V of 36 km/h, 43 km/h, 50 km/h, 57 km/h, 64 km/h, 71 km/h, 78 km/h, 85 km/h, 92 km/h and 99 km/h, respectively.

Further, as described above, the characteristic CH1 shown in FIG. 9 is set such that there exist other characteristics between adjacent characteristics and also on the low-speed side or on the high-speed side thereof.

Moreover, while FIG. 9 shows a case where the vehicle center $C_{VC}$ is positioned on the right side of the lane center $C_{LN}$ only, the first steering characteristic CH1 is configured such that there are also other characteristics in a case where the vehicle center $C_{VC}$ is positioned on the left side of the lane center $C_{LN}$, which are symmetrical to the characteristics CH1A-CH1J.

8. Relationship between Width Wi of Lane LN and Second Steering Characteristic CH2

Figure 10:
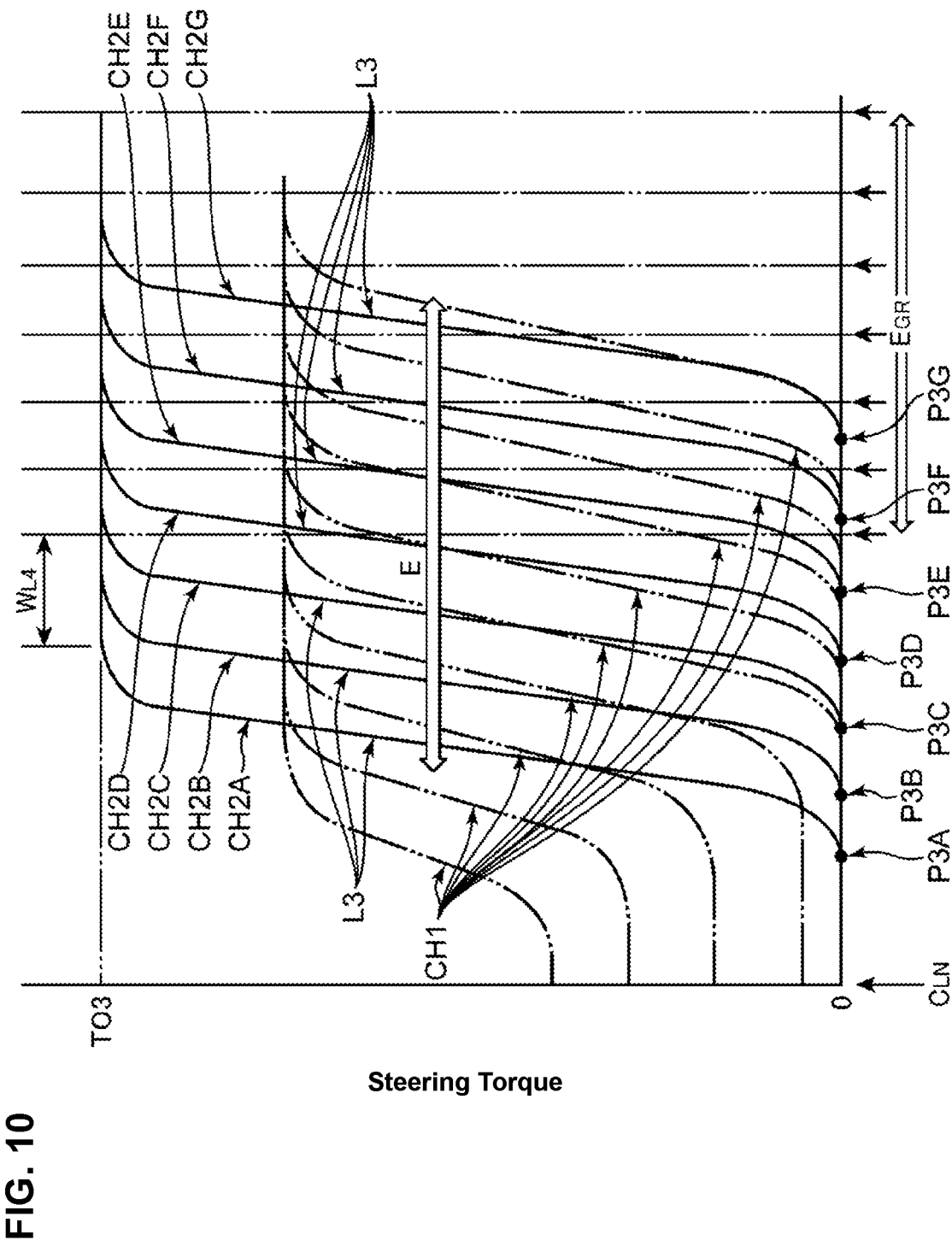
FIG. 10 is a characteristic diagram showing the second steering characteristic which is set in association with a width of the lane.

A relationship between the width $W_1$ of the lane LN and the set second steering characteristic CH2 will be described referring to FIG. 10. FIG. 10 is a characteristic diagram showing the second steering characteristic CH2 which is set in association with the allowed right-end point $E_{GR}$ which is defined from the width $W_1$ of the lane LN and the width $W_{VC}$ of the vehicle 1.

As shown in FIG. 10, the allowed right-end point $E_{GR}$ which becomes a standard in setting the second steering characteristic CH2 changes along the width direction of the lane LN according to a quantity (wideness/narrowness) of the width $W_1$ of the lane LN. Herein, a torque increase part L3 of the second steering characteristic CH2 changes according to this width-directional change of the allowed right-end point $E_{GR}$ such that it slides in a manner of CH2A-CH2G (an arrow E). Herein, while the first steering characteristic CH2 changing according to the width-directional position of the allowed right-end point $E_{GR}$ is shown in FIG. 10 by picking up the characteristics CH2A-CH2G, this characteristic CH2 is configured such that there exist other characteristics between adjacent characteristics and also on an outside range or on an inside range in the lane width direction.

Specifically, as shown in FIG. 10, the second steering characteristic CH2 (characteristics CH2A-CH2G) having the torque maintenance part L4 with the width $W_{L4}$ which is located on the inside of the allowed right-end point $E_{GR}$ is set in the vehicle 1 of the present embodiment. In the present embodiment, the width $W_{L4}$ of the torque maintenance part L4 is a constant width (30-50 cm, for example) as described above. Thus, the second steering characteristic CH2 is set such that the characteristics CH2A-CH2G thereof slide in the width direction of the lane LN according to the position of the allowed right-end point $E_{GR}$.

Further, respective second steering-torque application-start points P3A-P3G of the characteristics CH2A-CH2G of the second steering characteristic CH2 are set at respective specified positions in the width direction of the lane LN according to the allowed right-end point $E_{GR}$ which becomes the standard in setting the characteristics CH2A-CH2G.

While FIG. 10 shows a case where the vehicle center $C_{VC}$ is positioned on the right side of the lane center $C_{LN}$ only, the second steering characteristic CH2 is configured such that there are also other characteristics which have the standard of the allowed left-end point in a case where the vehicle center $C_{VC}$ is positioned on the left side of the lane center $C_{LN}$, which are symmetrical to the characteristics CH2A-CH2G.

9. Relationship between Radius Of Curvature R of Curved Portion and Second Steering Characteristic CH2

Figure 11:
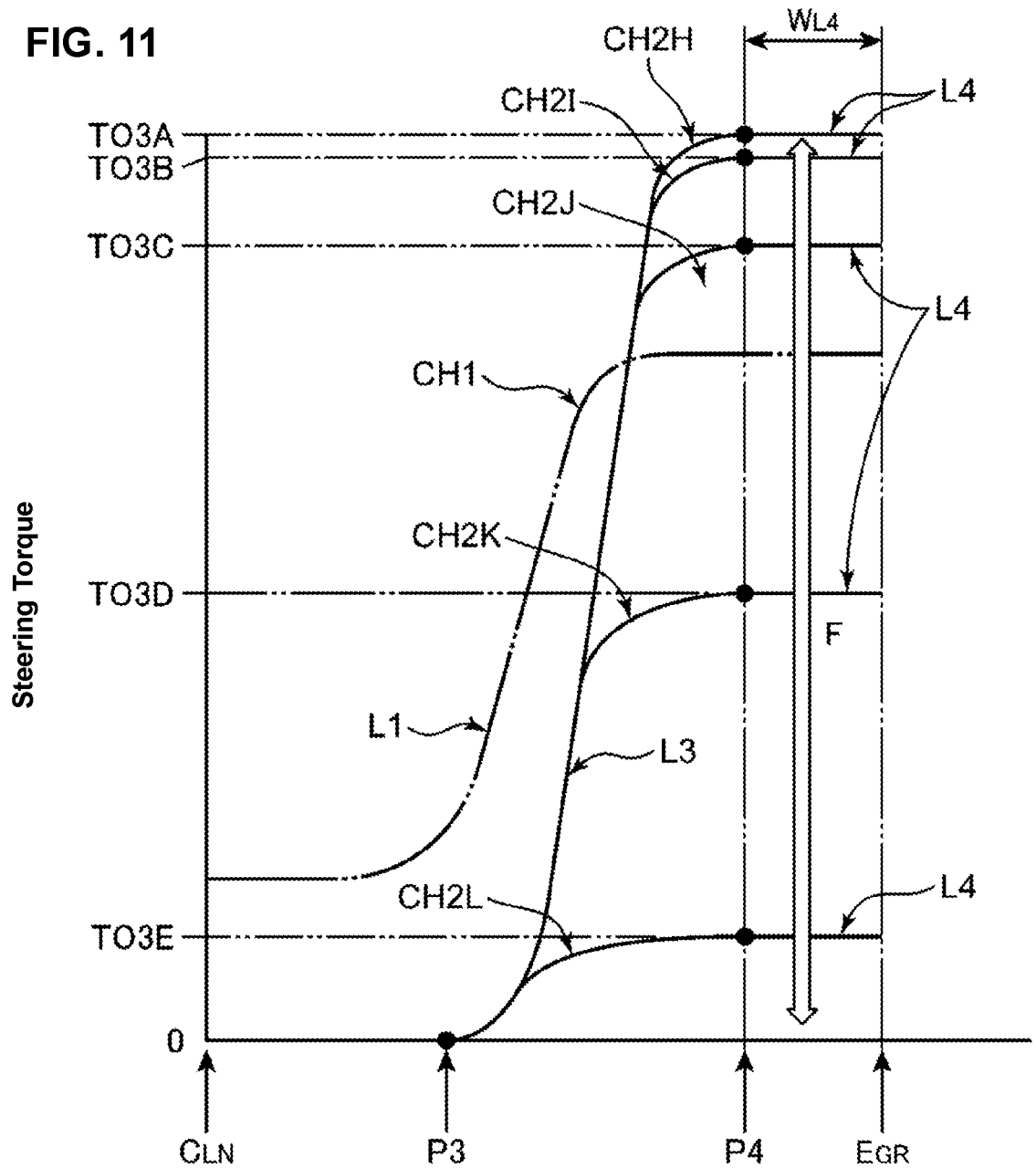
FIG. 11 is a characteristic diagram showing a relationship between a radius of curvature of the curved portion and the set second steering characteristic.
Figure 12:
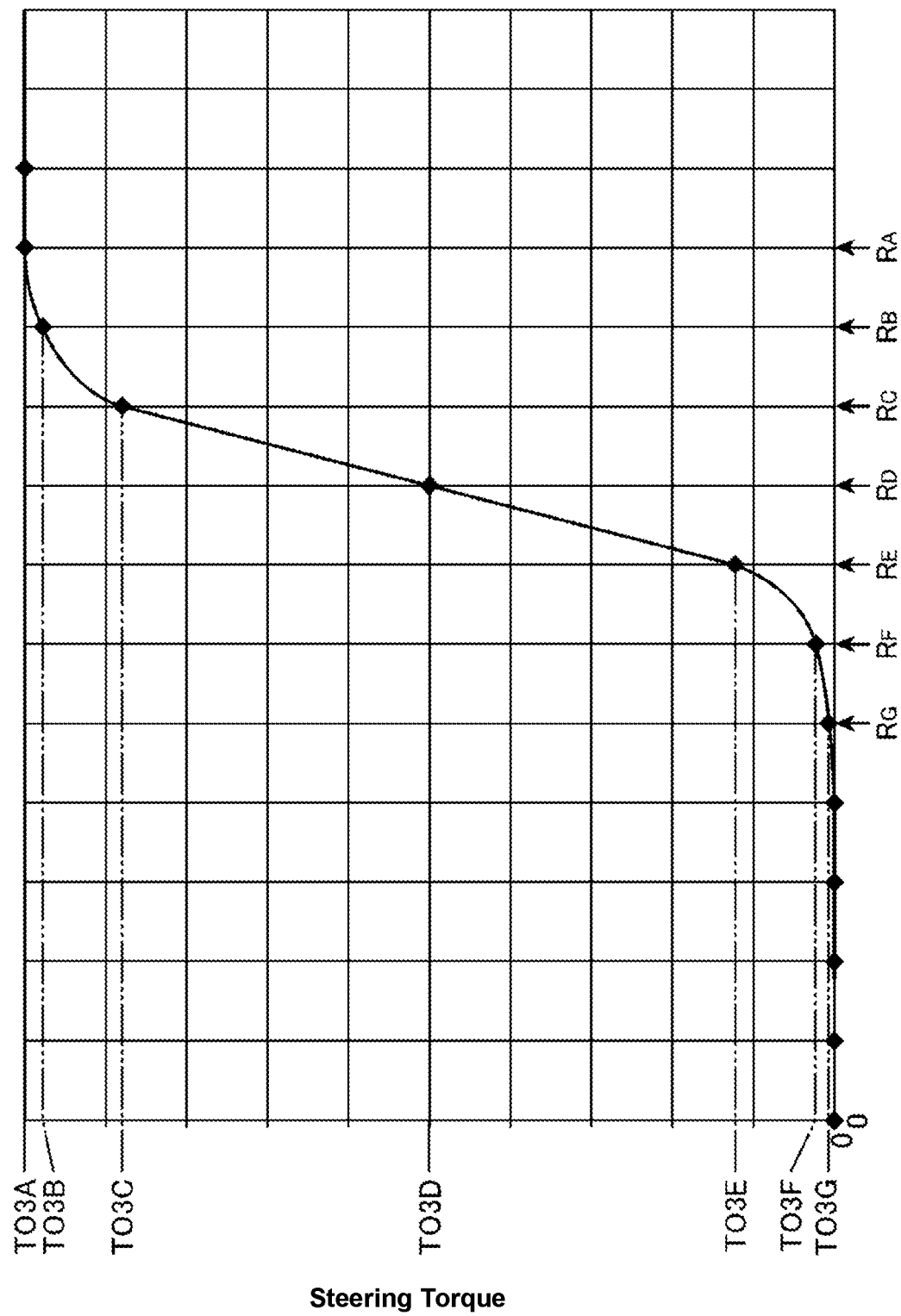
FIG. 12 is a graph showing a relationship between the radius of curvature of the curved portion and a magnitude of a third torque.

A relationship between the radius of curvature R of the curved portion and the set second steering characteristic CH2 in the case where the vehicle 1 travels at the curved portion of the lane LN will be described referring to FIGS. 11 and 12. FIG. 11 is a characteristic diagram showing the relationship between the radius of curvature R of the curved portion and the set second steering characteristic CH2, and FIG. 12 is a graph (characteristic diagram) having two-dimensional coordinates with a horizontal axis as the radius of curvature R of the curved portion and with the vertical axis as the magnitude of the third torque TO3.

As shown in FIG. 11, the second steering-torque application control part 252 of the control unit 25 according to the present embodiment changes setting of the torque maintenance part L4 of the second steering characteristic CH2 according to the radius of curvature R of the curved portion of the lane LN in the case where the vehicle 1 travels at the curved portion of the lane LN.

Specifically, a characteristic CH2H which has its torque maintenance part L4 where a torque TO3A which is larger than the magnitude of the third torque TO3 is maintained is set in a case where the radius of curvature R of the curved portion is large. Then, as the radius of curvature R of the curved portion becomes smaller, a characteristic CH2I having a torque TO3B as the magnitude of the third torque, a characteristic CH2J having a torque TO3C as the magnitude of the third torque, a characteristic CH2K having a torque TO3D as the magnitude of the third torque, and a characteristic CH2L having a torque TO3E as the magnitude of the third torque are set in order.

Herein, while the second steering characteristic CH2 changing according to the radius of curvature R of the curved portion is shown in FIG. 11 just by picking up the characteristics CH2H-CH2L, other steering characteristics which are positioned between adjacent characteristics or which have a higher third-torque magnitude than the characteristic CH2H or which have a lower third-torque magnitude than the characteristic CH2L are set as well.

Herein, the present embodiment is configured as shown in FIG. 11 such that the magnitude of the third torque TO3 gradually changes according to the radius of curvature R of the curved portion but the width $W_{L4}$ between the point P4 and the allowed right-end point $E_{GR}$ or inclination of the torque increase part L3 do not change.

In the graph of FIG. 12 having the two-dimensional coordinates with the horizontal axis as the radius of curvature R of the curved portion and with the vertical axis as the magnitude of the third torque TO3, the magnitude of the third torque TO3 changes gradually in a range from $R_G$ (first specified curvature-radius) to $R_A$ (first specified curvature-radius) of the radius of curvature R. The magnitude of the third torque TO3 is set at zero ("0") in a case where the radius of curvature R of the curved portion is smaller than $R_G$.

Meanwhile, the magnitude of the third torque TO3 is set at TO3A as its upper limit in a case where the radius of curvature R of the curved portion is larger than $R_G$.

The second steering characteristic CH2 is set as shown in FIG. 12 such that the magnitude of the third torque TO3 gradually increases in a manner of TO3G→TO3F→TO3E→TO3D→TO3C→TO3B→TO3A as the radius of curvature R of the curved portion of the lane LN gradually increases in a manner of $R_G \to R_F \to R_E \to R_D \to R_C \to R_B \to R_A$.

In the characteristic diagram shown in FIG. 12, the characteristic line is set such that the characteristic in a range: $R_E$-$R_C$ of the radius of curvature R changes linearly (in the linear-function manner), whereas the characteristics in a range: $R_G$-$R_E$ and $R_C$-$R_A$ of the radius of curvature R change in a curved manner (in the quadratic-function manner, the exponential-function, or the logarithmic-function manner).

As one example, the radius of curvature $R_G$ is 500 m and the radius of curvature $R_A$ is 1100 m.

10. Relationship between Vehicle Speed V and Steering Angle/Yaw Rate in Calculation of Radius of Curvature R In the present embodiment, the steering angle and the yaw rate are used in calculation of the radius of curvature R which is executed by the curvature-radius calculation part 254 of the control unit 25, and weighting of the steering angle and the yaw rate weighting is conducted according to the vehicle speed V. This weighting of the steering angle and the yaw rate weighting according to the vehicle speed V in the calculation of the radius of curvature R will be described referring to FIG. 13.

Figure 13:
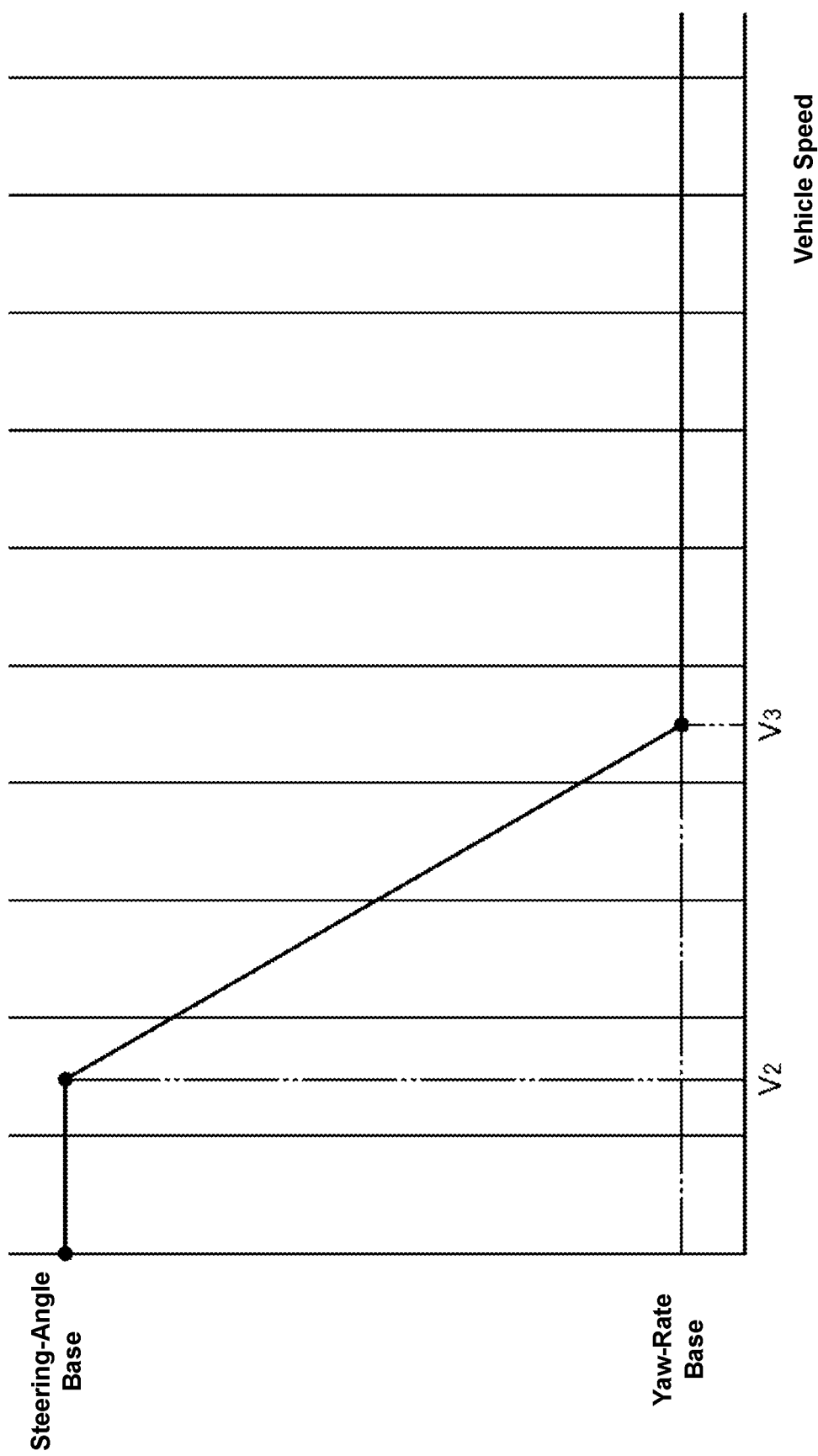
FIG. 13 is a schematic diagram for explaining weighting of a steering angle and a yaw rate to the vehicle speed in calculation of the radius of curvature.

FIG. 13 is a schematic diagram for explaining the weighting of the steering angle and the yaw rate to the vehicle speed V in the calculation of the radius of curvature R.

As shown in FIG. 13, the curvature-radius calculation part 254 calculates the radius of curvature R based on the detection results of the steering-angle sensor 15 but not based on the detection results of the yaw-rate sensor 21 in a case where the vehicle speed V is a relatively-low vehicle speed V2 or lower.

Meanwhile, in a case where the vehicle speed V is a relatively-high vehicle speed V3 or higher, the curvature-radius calculation part 254 calculates the radius of curvature R based on the detection results of the yaw-rate sensor 21 but not based on the detection results of the steering-angle sensor 15. Further, in a case where the vehicle speed V is within a range from the vehicle speed V2 to the vehicle speed V3, the curvature-radius calculation part 254 calculates the radius of curvature R based on the both detection results of the yaw-rate sensor 21 and the steering-angle sensor 15.

Herein, the image results picked up by the outside-monitor camera 20, the map information stored at the map-information storage 22 and others, in addition to the above-described detection results of the yaw-rate sensor 21 and the steering-angle sensor 15, are used in the calculation of the radius of curvature R executed by the curvature-radius calculation part 254.

11. Effects

In the vehicle 1 according to the present embodiment, since the torque increase part L1 of the first steering characteristic CH1 is located further outward (on the side of the allowed right-end point $E_{GR}$ or the allowed left-end point) in the width direction of the lane LN as the vehicle speed V becomes higher in the case where the vehicle 1 travels at the curved portion of the lane LN, intervention of the steering assist at a center-side portion (the lane center $C_{LN}$) in the width direction of the lane LN can be suppressed in a case where the vehicle 1 travels at the curved portion of the lane LN at the high speed. Accordingly, the intervention of the steering assist to the driver's steering is suppressed in the case where the vehicle 1 travels at the curved portion of the lane LN at the high speed, so that it can be properly prevented that troublesome or uncomfortable feelings are given to the driver.

Further, since the magnitude of the upper limit (the third torque TO3) of the torque increase part L3 of the second steering characteristic CH2 becomes lower as the radius of curvature R of the lane LN becomes smaller in the case where the vehicle 1 travels at the curved portion of the lane LN, application of an excessively-large steering torque ST2 to the steering wheel 10 of the vehicle 1 is suppressed even in a case where the vehicle 1 approaches the partition lines $DL_L$, $DL_R$ at an end of the lane LN according to an operation of the driver. Accordingly, the application of the large steering torque ST2 is suppressed in the case where the vehicle 1 travels at the curved portion of the lane LN having the small radius of curvature R, so that it can be properly prevented that troublesome or uncomfortable feelings are given to the driver.

Herein, the magnitude of the upper limit of the torque increase part L3 corresponds to the torque (the third torque TO3) of the torque maintenance part L4.

Moreover, since the relatively-large steering force ST2 is applied to the steering wheel 10 in a case where the vehicle 1 travels at the curved portion of the lane LN having a large radius of curvature R, vehicle's lane departure prevention is so attained that the high safety can be secured.

Consequently, the vehicle 1 according to the present invention can properly prevent troublesome/uncomfortable feelings or stress from being given to the driver during the vehicle driving, securing the high safety by preventing the vehicle's lane departure.

In the vehicle 1 according to the present embodiment, since the first steering characteristic CH1 is set such that the magnitude of the first torque TO1 becomes smaller as the vehicle speed V becomes higher, intervention of the lane keeping steering assist for making the vehicle 1 travel at the center of the lane LN is suppressed in a case where the vehicle speed V is high. Thus, the intervention of the steering assist to the driver's steering is suppressed in the case where the vehicle 1 travels at the curved portion of the lane LN at the high speed, so that it can be properly prevented that troublesome or uncomfortable feelings are given to the driver.

In the vehicle 1 according to the present embodiment, since the magnitude of the third torque TO3 gradually changes in a range of TO3G-TO3A according to the radius of curvature R in a case where the radius of curvature R is in a range from $R_G$ to $R_A$ as described referring to FIG. 12, it can be properly prevented, in a case of intervention of the steering assist, that troublesome or uncomfortable feelings are given to the driver, compared to a case where the magnitude of the third torque TO3 rapidly changes at a certain radius of curvature, for example.

In the vehicle 1 according to the present embodiment, since the magnitude of the third torque TO3 is set at zero ("0") in the case where the radius of curvature R of the curved portion of the lane LN on which the vehicle 1 travels is smaller than $R_G$, in a case where the vehicle 1 travels at an inside position, in the width direction, of the lane LN when traveling at a midway area, in the advancing direction, of the curved portion of the lane LN, for example, the steering torque ST2 is not applied, so that the driver can properly drive the vehicle 1 on a desired path (route) which the driver imaged. Thus, it can be properly prevented that troublesome or uncomfortable feelings are given to the driver by invalidating the intervention of the steering assist in the case where the radius of curvature R of the curved portion of the lane LN is smaller than $R_G$.

In the vehicle 1 according to the present embodiment, since the magnitude of the third torque TO3 is set at TO3A which corresponds to the magnitude of its upper limit in the case the radius of curvature R of the curved portion of the lane LN is larger than $R_A$, the steering torque larger than TO3A is not applied to the steering wheel 10 even in a case where the vehicle 1 travels at the gently-curved portion of the lane LN. Thus, since application of the excessively-large steering torque ST2 to the steering wheel 10 is avoided in the case where the vehicle 1 travels at the gently-curved portion of the lane LN, it can be properly prevented that troublesome or uncomfortable feelings are given to the driver, attaining the vehicle's lane departure prevention.

In the vehicle 1 according to the present embodiment, since the steering characteristic is set such that the characteristics in the range: $R_G$-$R_E$ and $R_C$-$R_A$ of the radius of curvature R change in the curved manner (in the quadratic-function manner, the exponential-function, or the logarithmic-function manner) as described referring to FIG. 12, it can be prevented that the magnitude of the third torque TO3 changes rapidly even in a case where the radius of curvature R of the curved portion of the lane LN on which the vehicle 1 travels changes. Thus, it can be more securely prevented that troublesome or uncomfortable feelings are given to the driver in the case where the vehicle 1 travels at the curved portion of the lane LN.

First Modified Example

Figure 14:
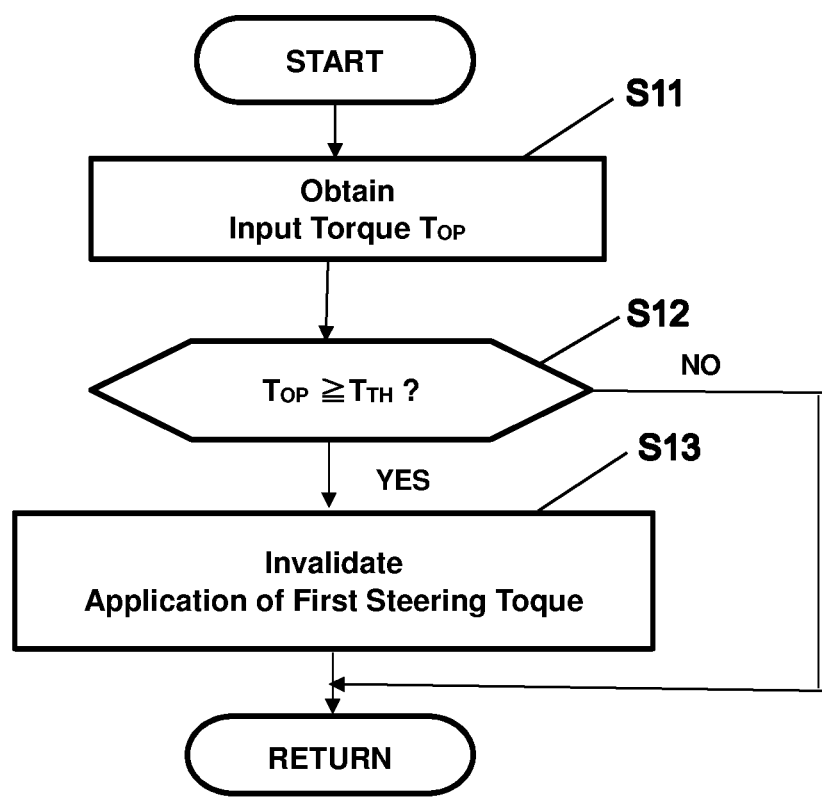
FIG. 14 is a flowchart of a method of a steering assist control which is executed by the control unit in the vehicle according to a first modified example.

A steering assist control executed by the control unit in the vehicle according to a first modified example will be described referring to FIG. 14. FIG. 14 is a flowchart of a method of the steering assist control executed by the control unit 25 in the vehicle according to the first modified example.

As shown in FIG. 14, the control unit 25 obtains detection results of the torque sensor 16 (an input torque Top which is inputted by the driver's operation of the steering wheel 10) (step S11). Next, the control unit 25 determines whether or not the obtained input torque Top is a predetermined threshold (specified operational force) $T_{TH}$ or larger (step S12).

In a case where the control unit 25 determines that the input torque Top is smaller than the threshold $T_{TH}$ (NO in the step S12), a control sequence is returned, where the first steering-torque application control part 251 of the control unit 25 executes setting of the steering torque to be applied to the steering wheel 10 based on the first steering characteristic CH1

Meanwhile, in a case where the control unit 25 determines that the input torque $T_{OP}$ is the threshold $T_{TH}$ or larger (YES in the step S12), application of the steering force set by the first steering-torque application control part 251 based on the first steering characteristic CH1 to the steering wheel 10 is invalidated (step S13).

Herein, the above-described threshold $T_{TH}$ is configured to change according to the vehicle speed V in this modified example.

The vehicle according to this modified example is configured to have the same structure and execute the same controls as the above-described embodiment, except the control regarding the application of the steering torque based on the first steering characteristic CH1 which has been described referring to FIG. 4.

In the vehicle according to this modified example, the application of the steering torque ST1 based on the first steering characteristic CH1 to the steering wheel 10 is invalidated in the case where the input torque Top relating to the driver's operation is the threshold $T_{TH}$ or larger, thereby giving priority to operation of the driver. That is, when the driver operates the steering wheel 10 with the large torque Top in the case where the vehicle travels at the curved portion of the lane, the intervention of the lane keeping steering assist based on the first steering characteristic CH1 is invalidated, so that the vehicle can be made travel on a smooth path (route) at the curved portion of the lane by the operation of the driver.

Second Modified Example

The above-described embodiment is configured, as described referring to FIG. 9, such that the magnitude of the first torque TO1 gradually changes in the manner of TO1A→TO1B→TO1C→TO1D as the first steering characteristic CH1 gradually change in the manner of CH1A→CH1B→CH1C→CH1D in the case where the vehicle speed V is in the relatively-low speed range (when the vehicle speed V is lower than the specified speed related to setting of the characteristic CH1D) (in the manner shown by the arrow D). Herein, in this modified example, the changing manner of the magnitude of the first steering torque TO1 is configured such that a difference between TO1A and TO1B is smaller than that between TO1B and TO1C, and the difference between TO1B and TO1C is smaller than that between TO1C and TO1D (see FIG. 9). That is, in the vehicle according to this modified example, the first steering characteristic CH1 is set in the case where the vehicle travels at the curved portion of the lane LN at the vehicle speed V which is the specified speed or lower such that a decrease degree of the magnitude of the first steering torque TO1 at the lane center $C_{LN}$ changes according to the vehicle speed V in such a manner that the higher the vehicle speed V is, the larger the decrease degree of the magnitude of the first steering torque TO1 is.

In this modified example, the vehicle speed between the vehicle speed V related to setting of the characteristic CH1D and the vehicle speed V related to setting of the characteristic CH1E corresponds to the above-described "specified speed" as well.

According to this modified example, since the decrease degree of the magnitude of the first steering torque TO1 at the lane center $C_{LN}$ becomes larger as the vehicle speed V becomes higher, the first steering torque ST1 applied to the steering wheel 10 at around the lane center $C_{LN}$ can be made smaller as the vehicle speed V becomes higher. That is, according to this modified example, the magnitude of the first steering torque is made smaller, not in the liner-function manner but in the quadratic-function manner, the exponential-function, or the logarithmic-function manner, as the vehicle speed V becomes higher in the case where the vehicle travels at the curved portion of the lane LN, so that the intervention of the steering assist to the driver's steering is so more suppressed that it can be more properly prevented that troublesome or uncomfortable feelings are given to the driver.

Other Modified Examples

While the first steering characteristic CH1 (CH1A-CH1D) set in the case where the vehicle speed V of the vehicle 1 is relatively low has the torque maintenance part where the constant magnitude of the torque is maintained as show in FIG. 9 in the above-described embodiment and first and second modified examples, the present invention is not limited to this. The first steering characteristic CH1 (CH1A-CH1D) may be configured to comprise the torque increase part L1 and the torque maintenance part L2 where the torque magnitude is maintained at the steering torque TO2, similarly to the characteristics CH1E-CH1J set in the case where the vehicle speed V is relatively high, for example.

While the second steering characteristic CH2 has the torque maintenance part L4 having the constant width $W_{L4}$ (30-50 cm, for example) which is located based on the allowed right-end point $E_{GR}$ or the allowed left-end point in the above-described embodiment and first and second modified examples, the present invention is not limited to this. The above-described width $W_{L4}$ may be configured to gradually change according to the width $W_1$ of the lane LN or the vehicle speed V, for example.

While the radius of curvature R of the lane LN is set to be the radius of curvature of the lane center $C_{LN}$ in the above-described embodiment and first and second modified examples, the present invention is not limited to this. That may be set to be a radius of curvature of the both-side partition lines of the lane, for example. In this case, it is necessary to execute the steering assist control described above, considering a difference from the radius of curvature of the lane center $C_{LN}$.

While the above-described embodiment and first and second modified examples did not refer to performance (role) of the alarm 23, this alarm 23 may be configured to issue a warning in a situation where the vehicle center $C_{VC}$ of the vehicle 1 becomes so close to the allowed right-end point $E_{GR}$ or the allowed left-end point, for example. More specifically, the alarm 23 may issue the warning to the driver when the vehicle center $C_{VC}$ of the vehicle 1 is located at a position on the outside, in the width direction, of the point P4.

Further, the vehicle speed V may be decreased by controlling the engine 2 or the brakes 7l, 7r, 9l, 9r in the situation where the vehicle center $C_{VC}$ of the vehicle 1 becomes so close to the allowed right-end point $E_{GR}$ or the allowed left-end point While the engine 2 is used as the power (drive) source in the above-described embodiment and first and second modified examples, the present invention is not limited to this. For example, an electric motor may be used as the power (drive) source.

What is claimed is:

1. A vehicle control device for applying a steering force to a steering wheel of a vehicle according to a vehicle traveling condition, comprising:
    a steering-force generator to generate the steering force applied to the steering wheel;
    a lane detector to detect a lane on which the vehicle travels;
    a vehicle-speed detector to detect a vehicle speed; and
    a controller to output a command signal to the steering-force generator based on detection results of the lane detector and the vehicle-speed detector,
    wherein said controller is configured to functionally comprise a first steering-force application control part for applying a first steering force to the steering wheel by means of said steering-force generator, a second steering-force application control part for applying a second steering force to the steering wheel by means of said steering-force generator, and a curvature-radius calculation part for calculating a radius of curvature of the lane,
    said first steering force is determined by a first steering characteristic which is operative to make the vehicle travel at a center of the lane,
    said second steering force is determined by a second steering characteristic, which is different from the first steering characteristic, which is operative to prevent the vehicle from deviating from the lane,
    in a case where said first steering characteristic and said second steering characteristic are shown by a characteristic diagram having two-dimensional coordinates with a horizontal axis as a position in a width direction of the lane and with a vertical axis as a magnitude of the steering force applied, the first steering characteristic includes a first steering-force increase part where said magnitude of the steering force gradually increases as said position changes from an inward side to an outward side in a width direction of the lane and the second steering characteristic includes a second steering-force increase part where said magnitude of the steering force gradually increases as said position changes from an inward side to an outward side in the width direction of the lane, and
    in a case where the vehicle travels at a curved portion of the lane, said first steering characteristic is set such that the position, in the width direction of the lane, of said first steering-force increase part changes according to the vehicle speed detected by said vehicle-speed detector in such a manner that the first steering-force increase part is located further outward in the width direction of the lane as the vehicle speed becomes higher and said second steering characteristic is set such that a magnitude of an upper limit of said second steering-force increase part changes according to the radius of curvature of the lane calculated by said curvature radius calculation part of the controller in such a manner that the magnitude of the upper limit becomes lower as the radius of curvature of the lane becomes smaller.

2. The vehicle control device of claim 1, wherein said first steering characteristic is set in the case where the vehicle travels at the curved portion of the lane such that the magnitude of said first steering force determined by the first steering characteristic changes according to the vehicle speed detected by said vehicle-speed detector in such a manner that the higher the vehicle speed is, the smaller the magnitude of the first steering force is.

3. The vehicle control device of claim 2, wherein said first steering characteristic is set in a case where the vehicle travels at the curved portion of the lane at the vehicle speed which is a specified speed or lower such that a decrease degree of the magnitude of said first steering force determined by the first steering characteristic at a center in the width direction of the lane changes according to the vehicle speed detected by said vehicle-speed detector in such a manner that the higher the vehicle speed is, the larger the decrease degree of the magnitude of the first steering force is.

4. The vehicle control device of claim 1, wherein said second steering characteristic is set in a case where the vehicle travels at the curved portion of the lane which has the radius of curvature between of a first specified curvature radius and a second specified curvature radius such that the magnitude of the second steering force gradually changes according to the radius of curvature calculated by said curvature-radius calculation part of the controller.

5. The vehicle control device of claim 2, wherein said second steering characteristic is set in a case where the vehicle travels at the curved portion of the lane which has the radius of curvature between of a first specified curvature radius and a second specified curvature radius such that the magnitude of the second steering force gradually changes according to the radius of curvature calculated by said curvature-radius calculation part of the controller.

6. The vehicle control device of claim 3, wherein said second steering characteristic is set in a case where the vehicle travels at the curved portion of the lane which has the radius of curvature between of a first specified curvature radius and a second specified curvature radius such that the magnitude of the second steering force gradually changes according to the radius of curvature calculated by said curvature-radius calculation part of the controller.

7. The vehicle control device of claim 6, wherein said second steering characteristic is set in a case where the vehicle travels at the curved portion of the lane which has the radius of curvature smaller than said first specified curvature radius such that the magnitude of said second steering force is zero.

8. The vehicle control device of claim 7, wherein said second steering characteristic is set in a case where the vehicle travels at the curved portion of the lane which has the radius of curvature larger than said second specified curvature radius such that the magnitude of said second steering force is a specified steering force.

9. The vehicle control device of claim 8, wherein in a case where said second steering characteristic is shown by a characteristic diagram having two-dimensional coordinates with a horizontal axis as the radius of curve of said curved portion of the lane and with a vertical axis as the magnitude of the second steering force, the second steering characteristic is set in a first specified area which is larger than said first specified curvature radius and a second specified area which is smaller than said second specified curvature radius such that the magnitude of said second steering force smoothly changes in a curved manner according to the radius of curvature of said curved portion of the lane.

10. The vehicle control device of claim 9, further comprising an operational-force detector to detect a magnitude of an operational force of a driver who operates the steering wheel, wherein said controller is configured to output the command signal to the steering-force generator based on detection results of said lane detector, the vehicle-speed detector, and said operational-force detector, and said controller is configured such that application of said first steering force to the steering wheel which is executed by said first steering-force application control part of the controller is invalidated in a case where the magnitude of the operational force detected by said operational-force detector is a specified operational force or larger.

11. A vehicle control method for applying a steering force to a steering wheel of a vehicle according to a vehicle traveling condition, comprising steps of:
detecting a lane on which the vehicle travels;
detecting a vehicle speed; and
applying the steering force to the steering wheel based on detection results of the lane detection step and the vehicle-speed detection step,
wherein said steering-force application step comprises a first steering-force application sub step of applying a first steering force to the steering wheel, a second steering-force application sub step of applying a second steering force to the steering wheel, and a curvature-radius calculation sub step of calculating a radius of curvature of the lane,
said first steering force is determined by a first steering characteristic which is operative to make the vehicle travel at a center of the lane,
said second steering force is determined by a second steering characteristic, which is different from the first steering characteristic, which is operative to prevent the vehicle from deviating from the lane,
in a case where said first steering characteristic and said second steering characteristic are shown by a characteristic diagram having two-dimensional coordinates with a horizontal axis as a position in a width direction of the lane and with a vertical axis as a magnitude of the steering force applied, the first steering characteristic includes a first steering-force increase part where said magnitude of the steering force gradually increases as said position changes from an inward side to an outward side in a width direction of the lane and the second steering characteristic includes a second steering-force increase part where said magnitude of the steering force gradually increases as said position changes from an inward side to an outward side in the width direction of the lane, and
in a case where the vehicle travels at a curved portion of the lane, said first steering characteristic is set such that the position, in the width direction of the lane, of said first steering-force increase part changes according to the vehicle speed detected by said vehicle-speed detector in such a manner that the first steering-force increase part is located further outward in the width direction of the lane as the vehicle speed becomes higher and said second steering characteristic is set such that a magnitude of an upper limit of said second steering-force increase part changes according to the radius of curvature of the lane calculated by said curvature radius calculation part of the controller in such a manner that the magnitude of the upper limit becomes lower as the radius of curvature of the lane becomes smaller.

12. The vehicle control method of claim 11, wherein said first steering characteristic is set in the case where the vehicle travels at the curved portion of the lane such that the magnitude of said first steering force determined by the first steering characteristic changes according to the vehicle speed detected by said vehicle-speed detector in such a manner that the higher the vehicle speed is, the smaller the magnitude of the first steering force is.

13. The vehicle control method of claim 12, wherein said first steering characteristic is set in a case where the vehicle travels at the curved portion of the lane at the vehicle speed which is a specified speed or lower such that a decrease degree of the magnitude of said first steering force determined by the first steering characteristic at a center in the width direction of the lane changes according to the vehicle speed detected by said vehicle-speed detector in such a manner that the higher the vehicle speed is, the larger the decrease degree of the magnitude of the first steering force is.

* * * * *